(12) United States Patent
Dilts

(10) Patent No.: US 9,881,404 B2
(45) Date of Patent: Jan. 30, 2018

(54) MANIPULATING GRAPHICAL OBJECTS

(71) Applicant: LUCID SOFTWARE, INC., South Jordan, UT (US)

(72) Inventor: Benjamin N. Dilts, Spanish Fork, UT (US)

(73) Assignee: LUCID SOFTWARE, INC., South Jordan, UT (US)

(*) Notice: Subject to any disclaimer, the term of this patent is extended or adjusted under 35 U.S.C. 154(b) by 238 days.

(21) Appl. No.: 14/664,809

(22) Filed: Mar. 21, 2015

(65) Prior Publication Data

US 2015/0193957 A1    Jul. 9, 2015

Related U.S. Application Data

(63) Continuation of application No. 12/896,664, filed on Oct. 1, 2010, now Pat. No. 9,019,275.

(51) Int. Cl.
| | |
|---|---|
| *G06T 11/60* | (2006.01) |
| *G09G 5/377* | (2006.01) |
| *G06F 3/0481* | (2013.01) |
| *G06F 3/0486* | (2013.01) |
| *G06F 17/30* | (2006.01) |

(Continued)

(52) U.S. Cl.
CPC ............ *G06T 11/60* (2013.01); *G06F 3/0486* (2013.01); *G06F 3/04812* (2013.01); *G06F 17/30882* (2013.01); *G06F 17/30896* (2013.01); *G09G 5/377* (2013.01); *G06F 3/0482* (2013.01); *G06T 11/206* (2013.01); *G09G 2340/12* (2013.01)

(58) Field of Classification Search
CPC .. G09G 5/377; G09G 2340/12; G06T 11/206; G06T 11/60; G06T 2207/20212; G06F 17/30896; G06F 11/60; G06F 11/206; G06F 3/0482; G06F 3/04812; G06F 3/0486; G06F 17/30882
See application file for complete search history.

(56) References Cited

U.S. PATENT DOCUMENTS

| | | |
|---|---|---|
| 5,844,558 A | 12/1998 | Kumar et al. |
| 6,035,305 A | 3/2000 | Strevey et al. |

(Continued)

OTHER PUBLICATIONS

"Adobe Photoshop 6.0 User Guide for Windows and Macintosh", Adobe Systems Incorporated, 2000, pp. 1, 12, 22-27, 32, 48, 92-97, 161, 205, 206, 248, 251-253, 347, 358.*

(Continued)

*Primary Examiner* — Michelle L Sams
(74) *Attorney, Agent, or Firm* — Maschoff Brennan

(57) ABSTRACT

In one example, a method for rendering graphical objects on a display includes rendering each of a plurality of graphical objects within respective layers. The plurality of graphical objects includes first, second and third graphical objects. The second graphical object is directly linked to the first graphical object and the third graphical object is directly linked to the second graphical object. The method additionally includes receiving user input manipulating one of the graphical objects in a manner that affects a directly linked graphical object. The method additionally includes re-rendering the manipulated graphical object and the directly linked graphical object without re-rendering graphical objects that are not directly linked to the manipulated graphical object.

14 Claims, 20 Drawing Sheets

(51) Int. Cl.
*G06F 3/0482* (2013.01)
*G06T 11/20* (2006.01)

(56) References Cited

U.S. PATENT DOCUMENTS

| | | | |
|---|---|---|---|
| 6,426,809 B1* | 7/2002 | Hayashi | H04N 1/33307 358/529 |
| 6,570,578 B1 | 5/2003 | Smirnov et al. | |
| 8,006,192 B1* | 8/2011 | Reid | G06F 3/0481 715/760 |
| 2002/0126138 A1 | 9/2002 | Shekter | |
| 2002/0135585 A1 | 9/2002 | Dye et al. | |
| 2003/0174165 A1 | 9/2003 | Barney | |
| 2006/0005114 A1 | 1/2006 | Williamson et al. | |
| 2006/0082583 A1 | 4/2006 | Leichtling et al. | |
| 2007/0013709 A1 | 1/2007 | Charles et al. | |
| 2007/0036403 A1 | 2/2007 | Albertson et al. | |
| 2007/0080963 A1 | 4/2007 | Christophe et al. | |
| 2007/0236509 A1 | 10/2007 | Eldridge et al. | |
| 2008/0184139 A1* | 7/2008 | Stewart | G06F 9/4443 715/762 |
| 2008/0313565 A1 | 12/2008 | Albertson | |
| 2010/0013845 A1* | 1/2010 | Yamamoto | G06T 1/60 345/557 |
| 2010/0289801 A1 | 11/2010 | Nachmanson | |
| 2012/0081389 A1 | 4/2012 | Dilts | |

OTHER PUBLICATIONS

Dayton, Linnea et al., "Photoshop WOW 5/5.5 WOW Book", Peach Pit Press, 2000, p. 268-274.*
"Adobe Photoshop 6 User Guide for Windows and Macintosh", Adobe Systems Inc. 2000, p. 42-43, 205-214, 226-242.*
KR Notice of Preliminary Rejection dated Jun. 21, 2016 as received in Application No. 10-2014-7030811 (English Translation).
KR Notice of Preliminary Rejection dated Dec. 21, 2016 as received in Application No. 10-2014-7030811 (English Translation).
KR Notice of Preliminary Rejection dated Dec. 21, 2016 as received in Application No. 10-2016-7022750 (English Translation).
Visio 2000 Standard Edition User Guide, 1999, Visio Corporation, pp. 16-19, 95-97.
MxGraph Thin Client-JGraph in a browser!, https://web.archive.org/web/20060505221139/http://www.jgraph.com/mxgraph.html, May 5, 2006.
JGraph and JGraph Layout Pro User Manual, Apr. 30, 2006, pp. 7.
Gliffy, http://web.archive.org/web/20090926202854/http://www.gliffy.com, Sep. 26, 2009.
International Search Report dated Dec. 27, 2013 as received in Application No. PCT/US2013/053866.
Written Opinion of the International Searching Authority dated Dec. 27, 2013 as received in Application No. PCT/US2013/053866.
KR Office Action dated Jul. 30, 2014 as received in Application No. 10-2013-7011435 (English Translation).
Bos, Cascading Style Sheets, level 2 CSS2 Specification, pp. 81-130, May 12, 1998, W3C, www.w3.org/TR/1998/REC-CSS2-19980512.
Agoston, Max K., Computer Graphics and Geometric Modeling: Implementation and Algorithms, pp. 264-278, Springer Verlag, London, (2005).
Omnigraffle for Mac, described in web-pages located at www.omnigroup.com, published by The Omni Group, Seattle, WA, (last accessed on Oct. 2012).
Drinstrastructor, "Visio Connectors and Connection Points", http://youtu.be/VYc26t1si1Q, Jul. 23, 2009.
Holzner, Steven, "Connecting Shapes and Adding Text in Visio 2007", Que Publishing, Apr. 3, 2008.
International Search Report dated May 2, 2012 as received in Application No. PCT/US2011/054381.
Nritten Opinion of the International Searching Authority dated May 2, 2012 as received in Application No. PCT/US2011/054381.
KR Notice of Allowance dated Jul. 31, 2017 as received in Application No. 10-2014-7030811 (English Translation).

* cited by examiner

MANIPULATING GRAPHICAL OBJECTS

CROSS-REFERENCE TO RELATED APPLICATIONS

This patent application is a continuation of U.S. patent application Ser. No. 12/896,664, filed Oct. 1, 2010, which is incorporated herein by reference.

BACKGROUND

Field of the Invention

The present invention relates generally to graphical objects. More particularly, some example embodiments relate to rendering and manipulating complex graphical objects.

Related Technology

Existing techniques for drawing, displaying, and/or manipulating graphical objects in web applications using native browser functionality are slow. This is seen when objects move on/across the screen or when users interact with graphical objects.

Typically, the entire working area that the user sees is redrawn every time an object moves. This is due to the existing implementations of native browser drawing capabilities. In the case of the HTML5 canvas element, the entire drawing area is a single raster device, and must be redrawn from scratch on most changes. In the case of SVG (scalable vector graphics), even the simplest changes to the markup representing the final object display can require the browser to "re-flow" and re-render the entire scene.

Hence the responsiveness of graphical applications delivered in a browser is often poor, frequently resulting in a visual latency or lag that causes a poor user experience. Alternatively, instead of giving users a real-time dynamic view of what changes will look like, many web based applications only provide a limited representation of tentative changes being made before the change is committed. For example, when a user clicks on an object and drags it with a mouse to move it, many applications will only show an outline or shadow of the object move along with the user's mouse cursor; it is only when the user releases the click (to confirm the move) that the object—and the page— is redrawn with the object in its new location and the rest of the page updated accordingly.

As a result, many "rich internet applications" delivered over the web make use of non-native browser technologies, such as browser plugins, e.g., Flash, Java or Silverlight, that make use of precompiled code running on virtual machines to allow rendering of and interaction with graphic elements. With plugins such as Flash, however, each time a change is made in code, the code must be re-compiled into a .swf ("Small Web Format" or "ShockWave Flash") file and uploaded to the server. The end-user must consequently re-download the entire application binary. These technologies also limit the deployment of the application to those platforms that support the required plugin.

Building on a proprietary plugin like Flash also restricts applications from using standard form controls that are common in web sites and web applications. This makes the whole user experience of Flash applications significantly different from that of other web applications, which can cause frustration and confusion for users.

Allowing other developers to create extensions for an application is difficult with Flash and similar technologies due to their closed, compiled nature. In addition, generating graphical output that is consistent across different browsers or different file types is difficult. For example, different browsers use different rendering techniques for graphics— Internet Explorer uses VML, whereas many other browsers support Canvas—so that building applications that present a consistent output across different browsers is difficult. The main challenge is that different output devices, such as different browsers, file formats, or image generation libraries, implement different subsets of common rendering functionality. Furthermore, outputting what the user sees in the browser to different file formats (such as vector PDF, for printing, or image formats such as PNG) in a consistent manner so that what is seen in the browser is the same as the PDF/PNG is also challenging.

The subject matter claimed herein is not limited to embodiments that solve any disadvantages or that operate only in environments such as those described above. Rather, this background is only provided to illustrate one exemplary technology area where some embodiments described herein may be practiced

BRIEF SUMMARY OF SOME EXAMPLE EMBODIMENTS

In general, some embodiments disclosed herein relate to rendering and manipulating graphical objects.

In one example embodiment, a method for rendering graphical objects on a display includes rendering each of a plurality of graphical objects within respective layers. The plurality of graphical objects includes first, second and third graphical objects. The second graphical object is directly linked to the first graphical object and the third graphical object is directly linked to the second graphical object. The method additionally includes receiving user input manipulating one of the graphical objects in a manner that affects a directly linked graphical object. The method additionally includes re-rendering the manipulated graphical object and the directly linked graphical object without re-rendering graphical objects that are not directly linked to the manipulated graphical object.

In another example embodiment, a method of representing and rendering graphical objects includes separating information for rendering a graphical object into a plurality of sets defining attributes of the graphical object, the graphical object configured to render within a local graphics context of a layer. The method additionally includes creating the layer at a particular position of a viewport having a global graphics context defining a global coordinate frame. The method additionally includes translating and scaling the local graphics context to match the global graphics context. The method additionally includes rendering the graphical object at the particular position of the viewport within the layer using the global coordinate frame.

In yet another example embodiment, a method of demonstrating the operation of an application includes receiving, from one or more input devices connected to a computing device, user input effective to initiate a demonstration of an application, the application being executable by the computing device. The method additionally includes initiating the demonstrating by generating input for the application based on simulated user actions. The method additionally includes executing the application using the generated input. Executing the application using the generated input includes creating and rendering a plurality of graphical objects on a display connected to the computing device in response to first generated input. Executing the application using the generated input additionally includes, in response to second generated input effective to manipulate one or more of the plurality of graphical objects, updating and re-rendering on the display one or more of the plurality of graphical objects affected by the manipulation substantially in real time as the manipulation occurs while continuously displaying all of the plurality of graphical objects unaffected by the manipulation.

In yet another example embodiment, a method for rendering graphical objects on a display includes receiving user input causing a first graphical object to be drawn on a display, the first graphical object being rendered in a first layer. The method additionally includes receiving user input causing a second graphical object to be drawn on the display, the second graphical object being rendered in a second layer different from the first layer, the first and second graphical objects being rendered simultaneously visible on the display. The method additionally includes receiving user input causing a connector to be drawn on the display, the connector connecting the first and second graphical objects and being rendered in a third layer different from the first and second layers. The method additionally includes receiving user input manipulating the first graphical object connected by the connector to the second graphical object. The method additionally includes continuously updating and rendering the first graphical object, second graphical object and connector in response to and during the manipulating substantially in real time. During the continuous updating and rendering, the first graphical object in the first layer is redrawn and the connector in the third layer is redrawn without redrawing the second graphical object in the second layer.

In yet another example embodiment, a method for rendering graphical information on a display includes storing data for rendering a graphical object in an intermediate data structure including a plurality of information items defining attributes of the graphical object. The method additionally includes rendering the attributes of the graphical object based on the plurality of information items. The method additionally includes displaying the graphical object on a display based on the rendered attributes. The method additionally includes receiving user input that causes at least some of the plurality of information items to change. The method additionally includes re-rendering some, but not all, of the attributes of the graphical object based on the changed information items.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION OF SOME EXAMPLE EMBODIMENTS

Embodiments of the invention generally relate to rendering and manipulating graphical objects (hereinafter "objects") in a web browser or other application. As used herein, "manipulating" an object includes moving, resizing, or changing some other attribute of the object. In some embodiments, each object is rendered in a different layer than other objects. Accordingly, when an object is manipulated, some embodiments permit the manipulated object to be re-rendered in its respective layer without re-rendering other unaffected objects in different layers.

Alternately or additionally, information to render an object is separated into different sets defining different attributes of the object. When one attribute of the object is changed, the changed attribute can be re-rendered without re-rendering unaffected attributes of the object.

Reference will now be made to the drawings to describe various aspects of example embodiments of the invention. It is to be understood that the drawings are diagrammatic and schematic representations of such example embodiments, and are not limiting of the present invention, nor are they necessarily drawn to scale.

I. First Example Embodiment

Figure 1:
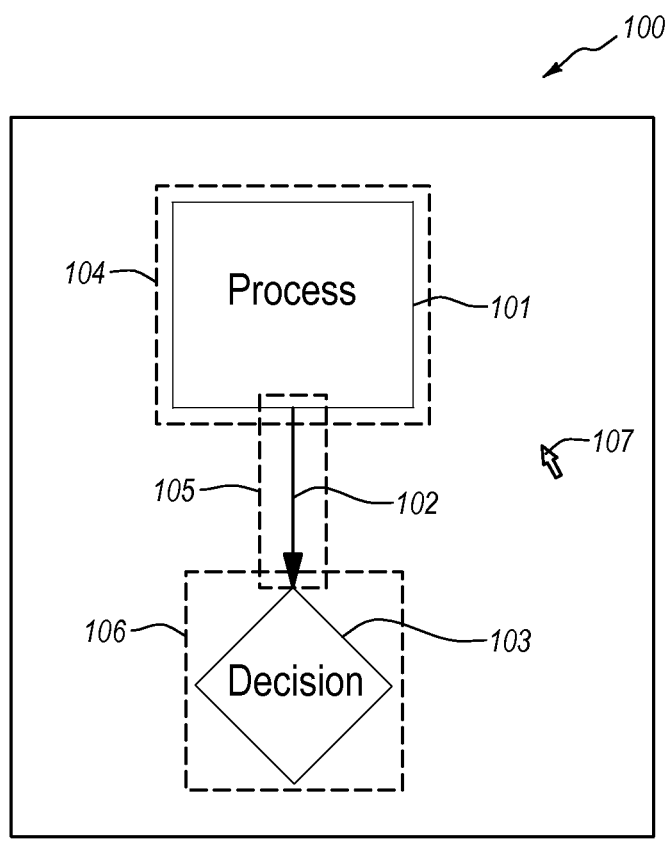
FIG. 1 illustrates a viewport of a user interface according to some embodiments.

With reference first to FIG. 1, one example embodiment is disclosed. FIG. 1 illustrates a viewport 100 of a user interface ("UI") according to some embodiments. The viewport 100 is hereinafter referred to as the UI viewport 100. The UI viewport 100 includes first, second and third objects 101, 102, 103. In the illustrated embodiment, the first and second objects 101, 102 are directly linked together and the second and third objects 102, 103 are directly linked together. As used herein, two objects are "directly" linked together if they are linked together without any intervening objects.

Additionally, the first object 101 is a process block. The second object 102 is a connector. The third object 103 is a decision block. More generally, the objects 101-103 can be any object.

Figure 2A:
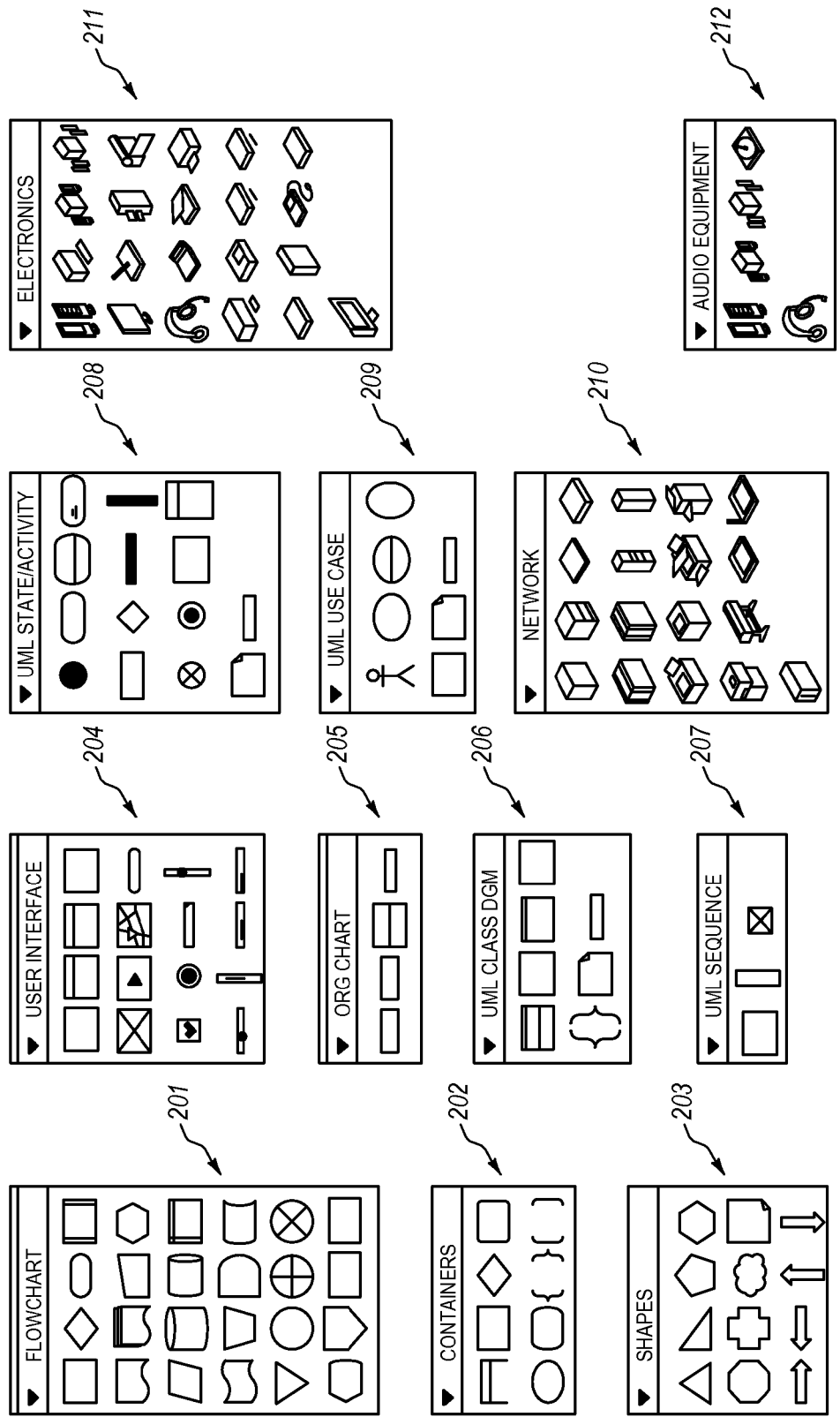
FIGS. 2A-2B illustrate examples of some objects that can be rendered in the viewport of FIG. 1.
Figure 2B:
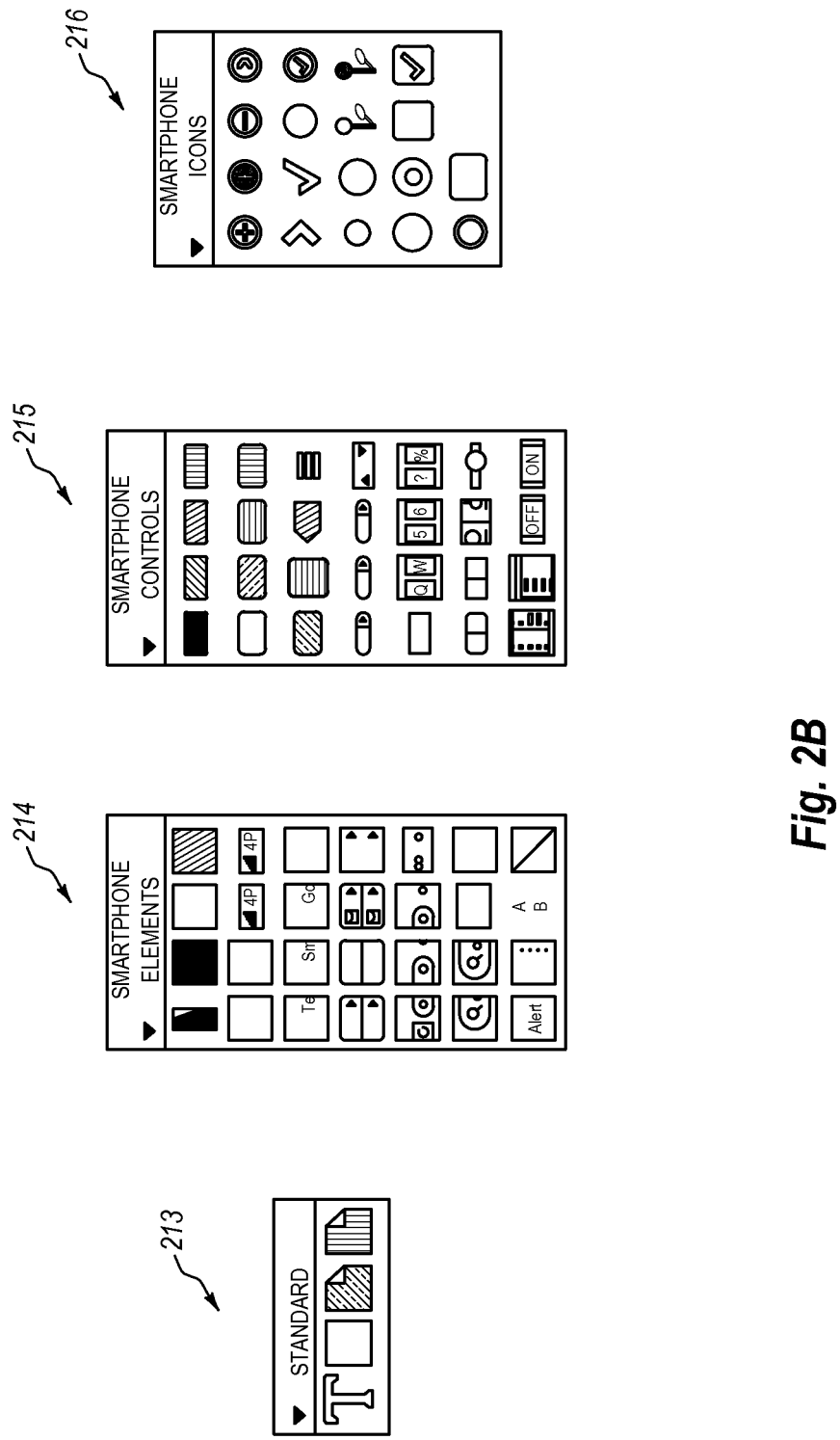

FIGS. 2A and 2B illustrate examples of some objects that can be rendered in the viewport 100 of FIG. 1. The objects illustrated in FIGS. 2A and 2B are organized into libraries based on a correspondence with other objects in the library. For instance, as illustrated in FIG. 2A, a flowchart library 201 includes objects that are used in flowcharts. Other libraries illustrated in FIG. 2A include a container library 202, shape library 203, user interface library 204, organizational chart library 205, unified modeling language ("UML") class diagram library 206, UML sequence library 207, UML state/activity library 208, UML use case library 209, network library 210, electronics library 211 and audio equipment library 212. Various libraries illustrated in FIG. 2B include a standard library 213, smartphone element library 214, smartphone controls library 215 and smartphone icons library 216.

Some embodiments may alternately or additionally include various other types of objects that are not shown in FIGS. 2A-2B. By way of example and not limitation, these other objects may include objects related to family trees/genograms/genographs, timelines, educational uses (e.g., Venn diagrams, math and grammar instruction, storyboards for writing instruction, or the like), business process models, timelines, room layout/interior design, floorplans, landscaping/landscape design, apparel/fashion, or the like.

Alternately or additionally, some embodiments may include images and/or other objects selected by a user or associated with a user or group of users. By way of example and not limitation, a user may select images or other objects stored locally on a client device, and/or images or other objects stored or available elsewhere (e.g., on a network, including but not limited to the public Internet), and organize these user-selected objects in a library or libraries. According to some embodiments, these objects may be selected by "dragging and dropping" such objects to the viewport 100, from any one of a variety of source locations such as, for example, a client desktop or local file system, or from a web page displayed on the client device. Similarly, objects and/or libraries may be selected by or associated with a group, such as a work group (for example, company logos, images, templates, etc.), a group of friends or inferred friends, a group with common or similar interests (known or inferred), according to any method now known or later developed. In these and other embodiments, the organization of objects into libraries may serve to help users more easily locate desired objects. In other embodiments, the objects are not organized into libraries.

One or more of the libraries 201-216 may be provided in a toolbar in the same UI as the UI viewport 100 of FIG. 1. In these and other embodiments, a user can create an object at a particular location in the UI viewport 100 by dragging an object from the toolbar and dropping it at the particular location in the UI viewport 100. Alternately or additionally, in response to the user creating a particular object, a set of objects that are likely to follow the particular object are presented to the user in the UI viewport 100. In response to the user selecting one of the objects from the set, the selected object is created in the UI viewport 100 following the particular object without the user performing a drag and drop operation.

Returning to FIG. 1, each of the objects 101-103 is rendered within a corresponding first layer 104, second layer 105 or third layer 106, denoted in FIG. 1 by the dashed line surrounding each object. Each layer 104-106 includes a single object 101-103 in the example of FIG. 1. Alternately or additionally, each layer 104-106 includes more than one object. In some embodiments, each layer 104-106 is an HTML5 canvas element or other layer suitable for providing the functionality described herein. Additionally, in the example of FIG. 1, each of the layers 104-106 is slightly larger than the corresponding object 101-103 rendered therein.

The UI viewport 100 is displayed on a display of a client device. The client device has one or more input devices, such as a keyboard, mouse, or the like, and/or the display may be a touchscreen display capable of receiving user input. In the illustrated embodiment, the client device on which the UI viewport 100 is displayed includes a mouse represented by a mouse cursor 107 in the UI viewport 100. The mouse or other input device permits a user to manipulate the objects 101-103 in the present example. Briefly, for instance, the user may operate the mouse or use a touchscreen interface to move or resize one of the objects 101-103, connect two objects together, or change some other attribute of an object.

According to some embodiments, rendering objects 101-103 within different layers 104-106 minimizes processing overhead for re-rendering the UI viewport 100 when one of the objects 101-103 is manipulated such as when one of the objects 101-103 is moved. In this and other embodiments, the moved object and one or more objects directly linked to the moved object are re-rendered in their respective layers while other objects not directly linked to the moved object are not re-rendered.

For instance, when the first object 101 is moved, the first object 101 is continuously re-rendered in the first layer 104. Because the second object 102 is directly linked to the first object 101, the second object 102 is affected in some embodiments by the movement of the first object 101. Accordingly, the second object 102 is continuously re-rendered in the second layer 105 while the first object 101 is being moved in this example. Moreover, because the third object 103 is not directly linked to the first object 101, the third object 103 is not re-rendered.

II. Hardware Configuration

Figure 3:
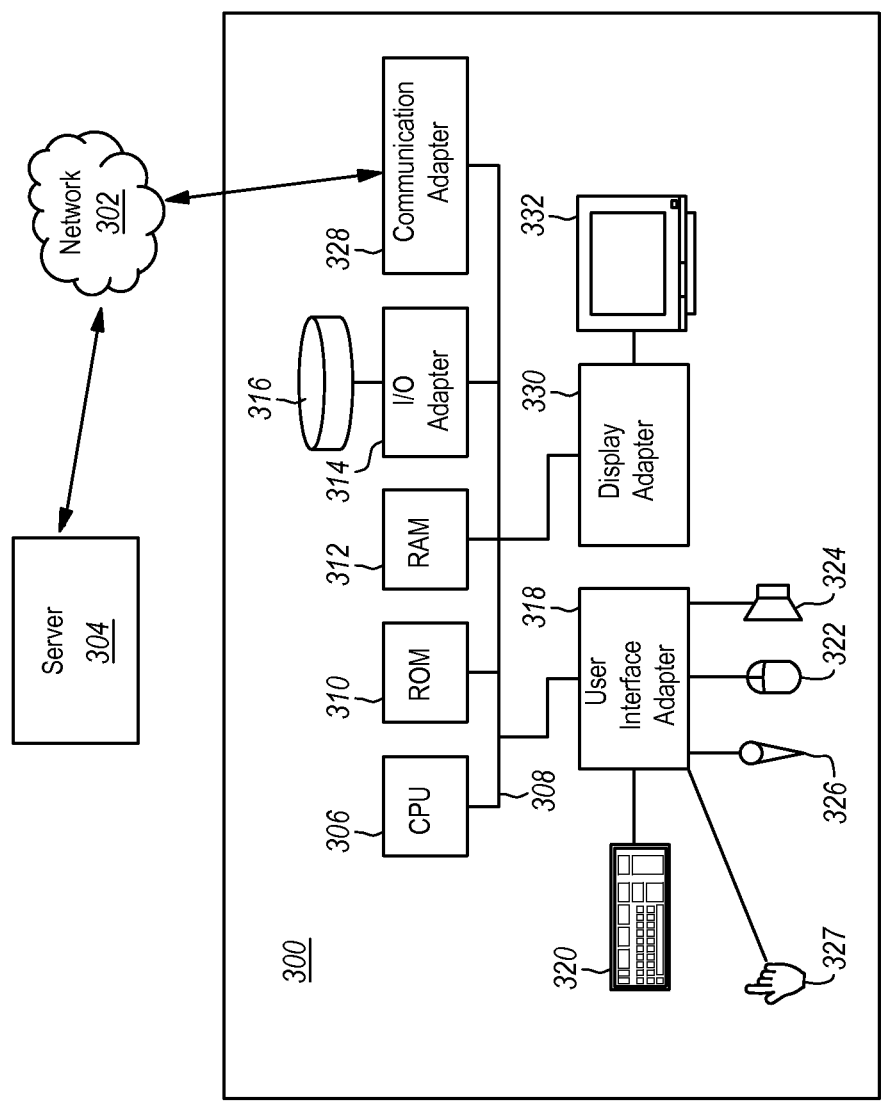
FIG. 3 depicts an example hardware configuration for a client device in which some embodiments can be implemented.

Turning next to FIG. 3, an example hardware configuration for a client device 300 or other computing device is disclosed in which some embodiments can be implemented. The client device 300 may be configured, for example, to communicate over a network 302 with a server 304. The client device 300 includes a central processing unit 306, such as a microprocessor, and a number of other units interconnected via a system bus 308. The other units include Read Only Memory ("ROM") 310, Random Access Memory ("RAM") 312, an input/output ("I/O") adapter 314 for connecting peripheral devices such as disk storage units 316 to the system bus 308, a user interface adapter 318 for connecting a keyboard 320, a mouse 322, a speaker 324, a microphone 326, a touchscreen interface 327 and/or other user interface devices to the bus 308, a communication adapter 328 for communicating over the network 302, and a display adapter 330 for connecting the bus 308 to a display device 332.

The client device 300 typically has resident thereon a suitable operating system ("OS") such as a Microsoft Windows OS (e.g., 7, Vista, XP), a MAC OS, a Unix OS, a Linux OS, a mobile OS (e.g. iPhone OS, Windows Mobile, Symbian, Android OS, Blackberry OS, etc.) or other suitable OS. Those skilled in the art will appreciate that the embodiments disclosed herein may alternately be implemented on platforms and operating systems other than those explicitly mentioned herein.

In some embodiments, the client device 300 executes a web browser to download and interact with web pages hosted by the server 304. The web browser may be loaded to RAM 312 or stored in some other computer storage and executed by the CPU 306, for instance. One or more of the web pages provided by the server 304 to the client device 300 may include a runtime script. The runtime script is JavaScript in some examples. Alternately or additionally, the runtime script includes instructions executable by the client device 300 to perform one or more of the methods described herein.

III. Object Representation

As described above with respect to FIG. 1, some embodiments minimize processing overhead by rendering objects 101-103 within different layers 104-106. Alternately or additionally, processing overhead may be minimized by separating information for rendering an object into multiple information sets defining different attributes of the object. By separating the rendering information into information sets defining different attributes, a change to a single attribute can be effectuated by re-rendering the single attribute without re-rendering other attributes defined by other information sets.

Figure 4:
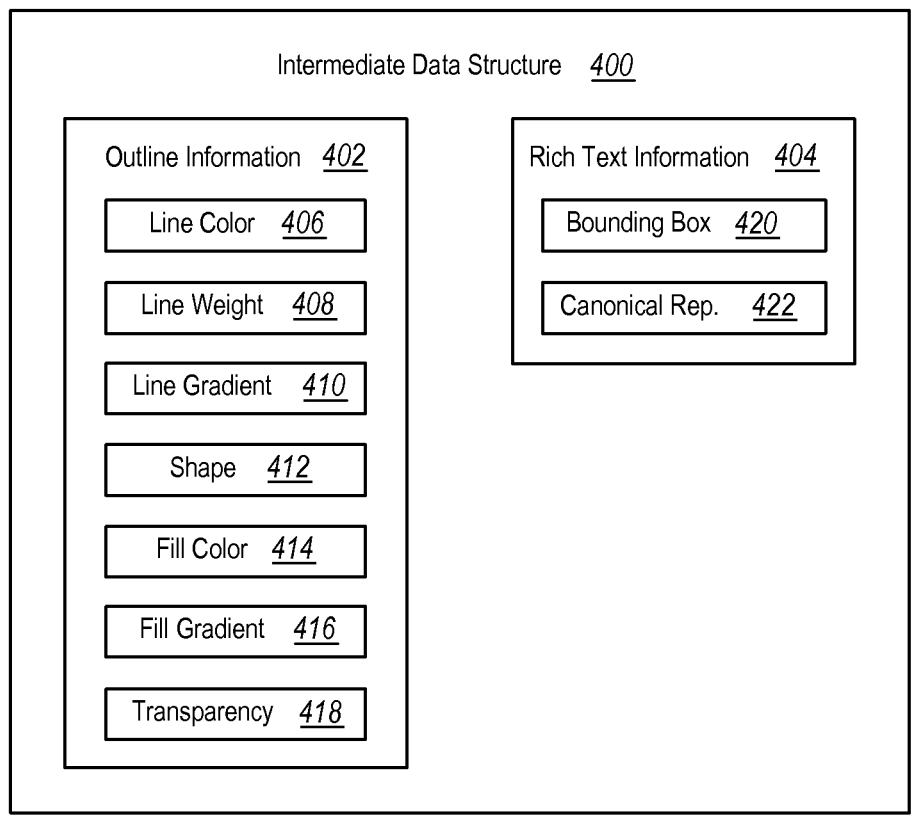
FIG. 4 illustrates an example intermediate data structure used to represent and describe how an object is to be rendered according to some embodiments.

In this and other examples, each object to be rendered is represented in an intermediate data structure describing how the object is to be rendered. For instance, FIG. 4 illustrates an example intermediate data structure 400 used to represent and describe how an object may be rendered. The intermediate data structure 400 includes a plurality of information sets 402 and 404 defining attributes of the object. In this example, the first information set 402 generally defines an outline of the object and the second information set 404 generally defines a rich text area of the object.

In more detail, the first information set 402 defines one or more of a color 406 of a line making up the outline of the object, a weight 408 of the line making up the outline, a gradient 410 (e.g., solid, dashed, dotted) of the line making up the outline, a shape 412 of an area bounded by the outline, a fill color 414 of the area bounded by the outline, a fill gradient 416 of the fill color and a transparency level 418 of the fill color.

The shape 412 information may include one or more commands defining the shape of the object's outline. "Move," "line," "quadratic Bezier curve," and "close shape" commands are examples of commands that can be included in the shape 412 information to define the shape of the object's outline.

The first information set 402 may omit some or all of the foregoing rendering information depending on the object represented by the intermediate data structure 400. For instance, fill color 414, fill gradient 416 and transparency 418 may be omitted from the first information set 402 for an object such as the connector 102 of FIG. 1 in some examples. Other embodiments of the invention may including additional or different rendering information not represented in FIG. 4, such as, without limitation, rendering information defining a number of buttons to include in toolbar object or other object, rendering information defining corner effects (e.g., how soft or round to make corners), rendering information defining a geometric transformation of an object (e.g., rotation angle, stretch, skew), rendering information defining one or more other effects (e.g., a drop shadow under an object, the size, projection angle, or thickness of the drop shadow, 3-D effects such as extrusion effects), rendering information defining Boolean combinations of different objects to create a single object, or the like or any combination thereof. More generally, the rendering information included in the intermediate data structure 400 can include any type of information that could be used in determining how to render an object.

The second information set 404 defines one or more of a bounding box 420 in relation to the object outline and within which rich text is rendered and a canonical representation 422 of the rich text. In some embodiments, the canonical representation 422 of the rich text is an extensible markup language ("XML") representation of the rich text specifying one or more of color, font, bold, italics, underline, size or other aspects of the rich text. In these and certain other embodiments, the XML somewhat resembles hypertext markup language ("HTML") and can be derived from any valid HTML. Text is edited by translating the canonical representation into rich text such as HTML, receiving user input effective to edit the text through a browser- or other application-based rich-text editor, and then translating the result back into the canonical representation.

Decomposing complex rendering information for each object in a file into the limited information included in the intermediate data structure 400 of FIG. 4 ensures, in some examples, a consistent output irrespective of the file type of the output file, or the browser or other application used to view the file. For instance, while some web browsers support drawing circles, the portable document format ("PDF") does not. By approximating circles using quadratic Bezier curves, the intermediate data structure 400 permits circles to be rendered consistently by web browsers, in PDF format, and by other applications or in other formats.

Alternately or additionally, decomposing the rendering information into limited information included in an intermediate data structure can result in less processing and faster rendering of an object when attributes of the object are changed. For example, when only an outline of an object is changed, the outline can be re-rendered without re-rendering text of the object. As another example, when only text of an object is changed, the text can be re-rendered without re-rendering the outline of the object. By re-rendering only those attributes of an object that are affected by changes, it takes relatively less processing power and time to re-render an object compared to re-rendering every attribute of the object whether or not every attribute is affected by a given change.

The information sets 402, 404 and rendering information 406, 408, 410, 412, 414, 416, 418, 420, 422 are provided by way of example only and should not be construed to limit the invention. For instance, intermediate data structure 400 according to embodiments of the invention may include more than two information sets 402, 404 and/or different information sets than information sets 402, 404, such as (by way of example and not limitation) an information set generally defining semantic attributes of the object, or other information sets. Similarly, rendering information according to various embodiments of the invention may include different and/or additional rendering information, such as (by way of example and not limitation) rendering information defining whether an object represents an interface, rendering information defining whether an object is to be included in one but not both of a displayed and printed version of a document, rendering information defining a number of dropdown items associated with an object, rendering information defining a uniform resource identifier ("URI"), or other rendering information.

IV. User Interface

Figure 5A:
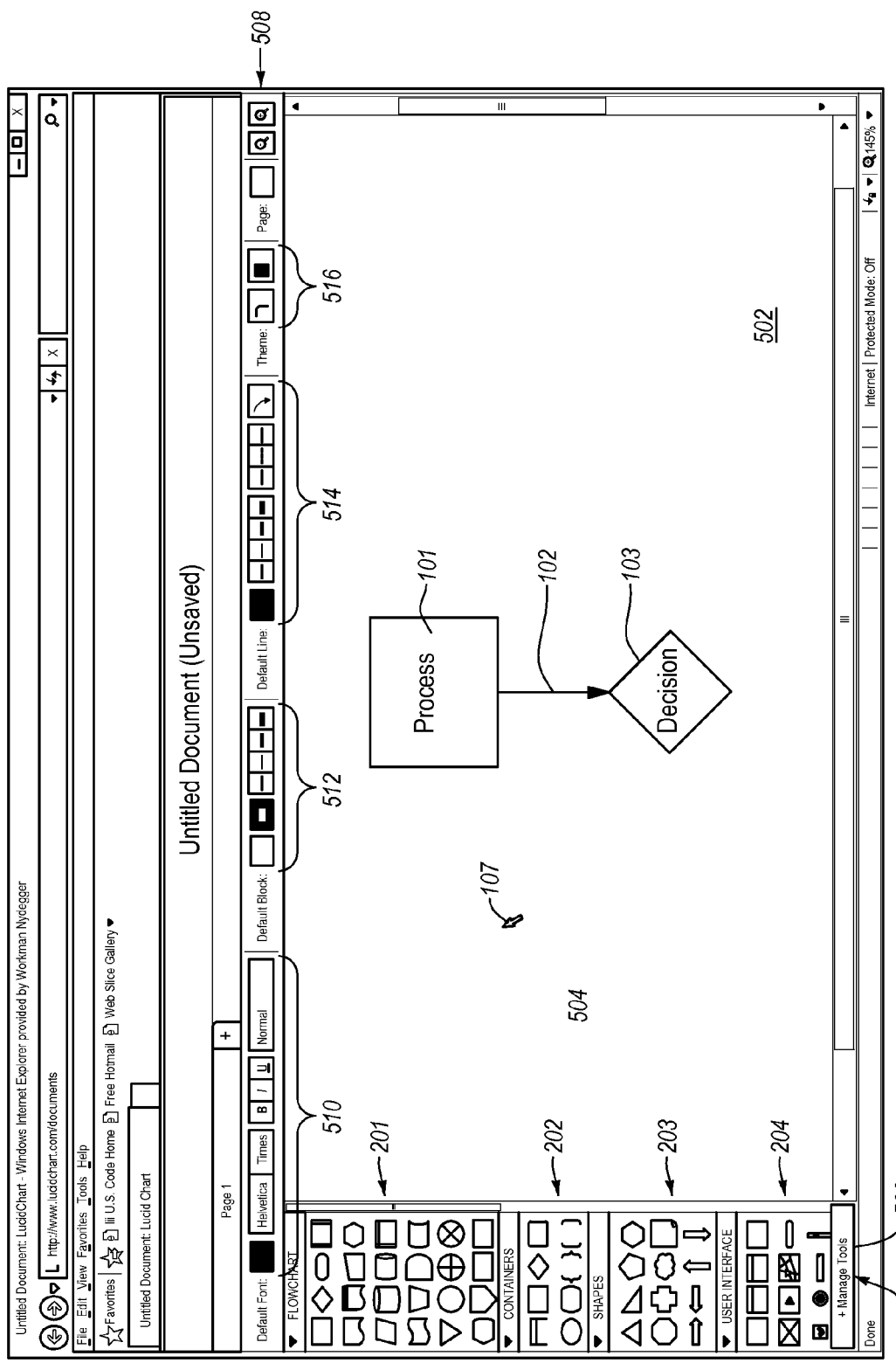
FIGS. 5A-5L depict aspects of an example user interface in which objects can be rendered.
Figure 5B:
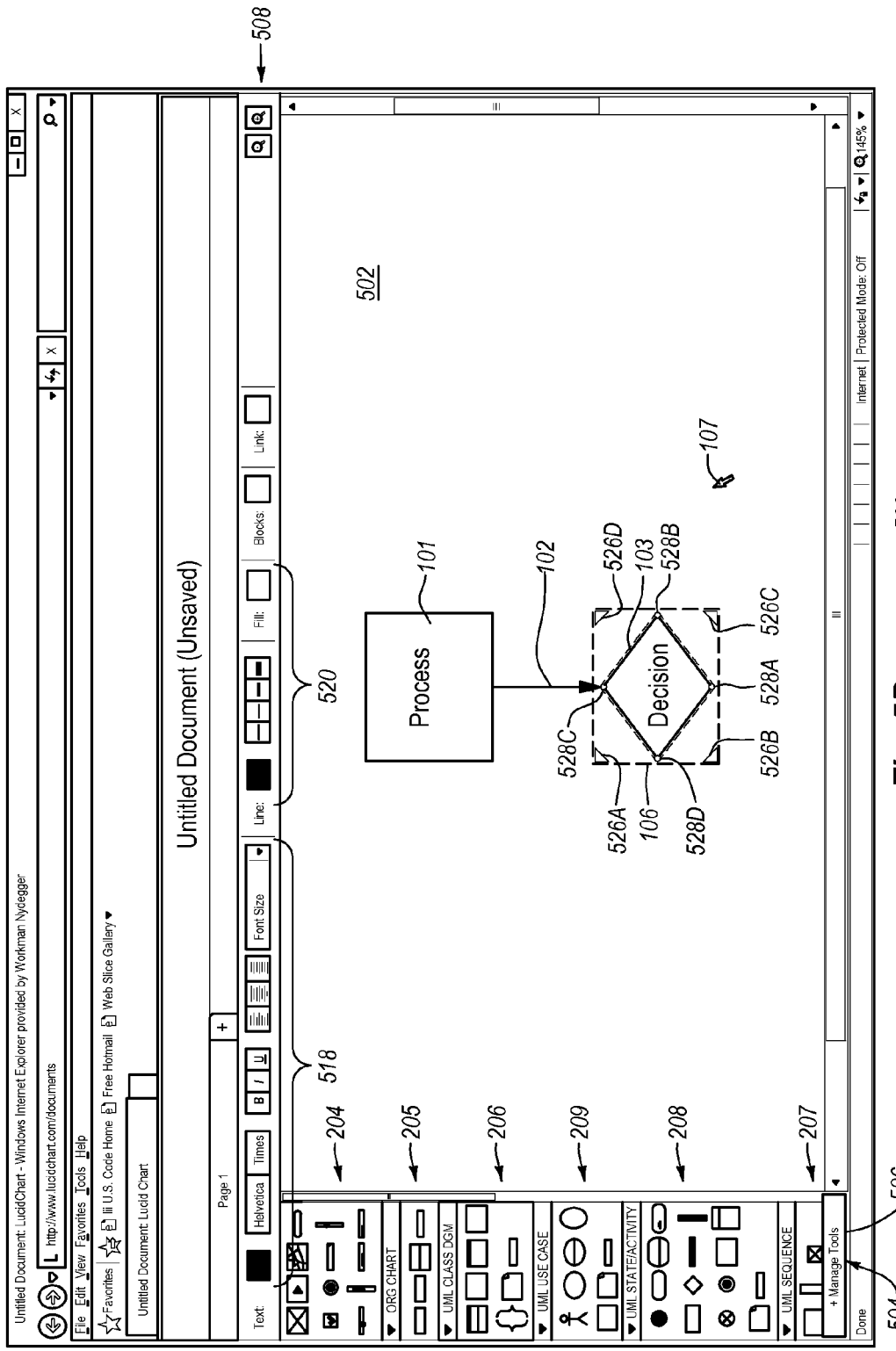
Figure 5C:
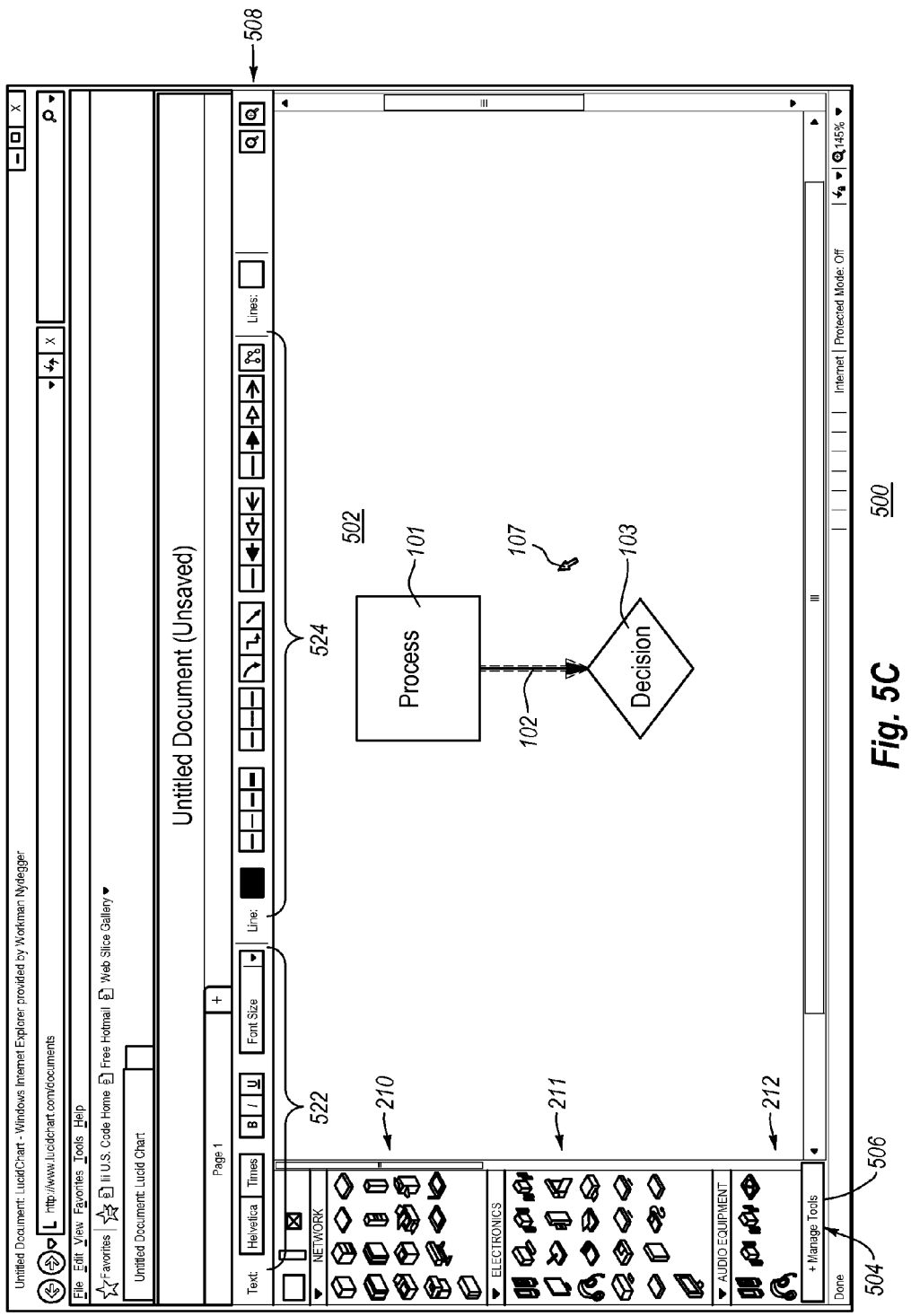

FIGS. 5A-5L depict aspects of an example UI 500 in which objects can be rendered according to some embodiments. The UI 500 may be provided through a web browser or other suitable application. As shown in FIGS. 5A-5C, the UI 500 includes a UI viewport 502 wherein a document is displayed. The document includes the objects 101-103 of FIG. 1. Mouse cursor 107 represents a mouse operated by the user to navigate the UI 500. In other embodiments, a user navigates the UI 500 using a touchscreen interface. For simplicity, however, interactions with the UI 500 will be described in terms of a mouse/mouse cursor 107, with the understanding that any other suitable input means can be implemented to navigate the UI 500.

One or more of the object libraries 201-216 of FIGS. 2A-2B are provided in a scrollable toolbar 504 along the left edge of the UI 500. Optionally, each object library 201-216 can be collapsed or expanded by clicking the header containing the name (e.g., "Flowchart," "Containers," "Shapes," etc.) of the object library 201-216. Alternately or additionally, a button 506 provided at the bottom of the toolbar 504 can be used to completely remove an object library 201-216 from the toolbar 504 or add a new object library 201-216 to the toolbar 504.

According to some embodiments, another toolbar 508 is provided above the UI viewport 502. Optionally, the buttons available in the toolbar 508 vary depending on whether an object is selected and/or the type of the object. For instance, in the example of FIG. 5A, none of the objects 101-103 displayed in the UI 500 is selected. In this example, various buttons 510, 512, 514, 516 provided in the toolbar 508 permit a user to configure default settings for new objects created in the UI 500. The settings of each object created in the UI 500, whether default settings or otherwise, determine the attributes defined by the information sets 402, 404 (FIG. 4), etc. of the intermediate data structure 400 (FIG. 4) representing the object.

In the illustrated embodiment of FIG. 5A, the user can use the buttons 510, 512, 514, 516 provided in the toolbar 508 to set default text settings, default block settings, default line settings and/or default theme settings. In more detail, the buttons 510 are used to set default text settings such as color, font, emphasis (e.g., bold/italic/underline), or size of the text included in new objects. The buttons 512 are used to set default block settings such as fill color, outline color, or outline thickness of new block objects. The buttons 514 are used to set default line settings such as line color, line thickness, line gradient, or line style (e.g., curved, elbow, direct) of new connectors. The buttons 516 are used to set default theme settings such as corner style (e.g., square, soft, rounded) and fill gradient style (e.g., no gradient, soft gradient, strong gradient) of new objects. The particular default settings of FIG. 5A and the settings of FIGS. 5B and 5C are described by way of example only and should not be construed to limit the invention.

Alternately, in the example of FIG. 5B, the third object 103 has been selected, indicated by highlighting surrounding the third object 103. Accordingly, the toolbar 508 in FIG. 5B provides buttons 518, 520 that permit a user to configure settings of the selected third object 103 without affecting the settings of the first or second objects 101, 102. Some of the buttons 518 are analogous to some of the buttons 510 of FIG. 5A and can be used to set text settings such as color, font, emphasis, or size and can additionally be used to set alignment (e.g., left, center, right) of the text included in the selected third object 103. The buttons 520 are analogous to the buttons 512 of FIG. 5A and can be used to set block settings such as outline color, outline thickness or fill color of the selected third object 103.

Alternately, in the example of FIG. 5C, the second object 102 has been selected, indicated by highlighting surrounding the second object 102. Accordingly, the toolbar 508 in FIG. 5C provides buttons 522, 524 that permit a user to configure settings of the selected second object 102 without affecting settings of the first or third objects 101, 103. Some of the buttons 522 are analogous to the buttons 510 of FIG. 5A and can be used to set text settings such as font, emphasis, or size of text included in the selected second object 102. Some of the buttons 524 are analogous to some of the buttons 514 of FIG. 5A and can be used to set line settings such as line color, line thickness, line gradient, or line style and can additionally be used to set beginning/end styles (e.g., none, arrow, hollow arrow, open arrow) of the selected second object 102 or to edit the shape of the selected second object 102 as discussed with respect to FIGS. 5H and 5I below.

Referring to FIG. 5B, the third layer 106 within which the third object 103 is rendered is denoted by the dashed line surrounding the third object 103. Although dashed lines are provided in FIGS. 1, 5B and other Figures herein for use in identifying some or all of the layers 104-106, in certain embodiments of the invention layers are not generally visible in the UI 500 to a user and are merely provided in the Figures for convenience in describing aspects of the invention.

In some embodiments, objects, such as the third object 103, are rendered on the UI 500 with reference to the corresponding layer, such as the third layer 106. For instance, the size and position of the layer may correspond to the size and position of the object. In these and other embodiments, for example, as a user manipulates the third object 103 the third layer 106 may also change accordingly. In this regard, the layer containing the object may include one or more controls that can be used to manipulate the layer and the object. Further, according to some embodiments, the controls are positioned in certain areas of the layer and may be highlighted in response to certain user input. For instance, the controls may be highlighted in response to a user selecting the object, in response to the mouse cursor 107 hovering over an area corresponding to the control, or both.

In the illustrated embodiment of FIG. 5B, for example, the third layer 106 includes resizing controls 526A-526D (collectively "resizing controls 526") disposed at the four corners of the third layer 106, and certain connection controls 528A-528D (collectively "connection controls 528") disposed in the third layer 106 near the four corners of the third object 103. In this example, the resizing controls 526 and connection controls 528 are highlighted in response to a user selecting the third object 103.

The resizing controls 526 can be used to resize the third layer 106 and the third object 103 by, e.g., a user moving the mouse cursor 107 to one of the resizing controls 526, depressing the left mouse button while the mouse cursor 107 is hovering over the resizing control 526, dragging the mouse cursor 107 and resizing control 526 in a direction effective to resize the third layer 106, and releasing the left mouse button when the third layer 106 is a desired size. For example, clicking and dragging resizing control 526A to the left and/or upwards increases the size of the third layer 106 and third object 103, while clicking and dragging resizing control 526A to the right and/or downwards decreases the size of the third layer 106 and third object 103.

The action of a user depressing a mouse button, dragging the mouse cursor 107 to a different location and releasing the mouse button may be referred to herein as "clicking and dragging." Depending on the input device involved and/or the configuration of the input device, other actions of a user may similarly result in a click and drag action.

The connection controls 528 can be used to attach a connector to the third layer 106, and thus the third object 103 by, e.g., a user positioning the mouse cursor 107 over one of the connection controls 528, and clicking and dragging the mouse cursor 107 to a terminal location where the resulting connector terminates. In some embodiments, the resulting connector is rendered in the UI 500 after the mouse cursor 107 has been dragged a predetermined distance from the connection control 528, the resulting connector beginning at the connection control 528 and terminating at the mouse cursor 107. Alternately or additionally, until the left mouse button is released and while the user is dragging the mouse cursor 107 about the UI 500, the resulting connector is continuously re-rendered in the UI 500 and terminates at a location near the moving mouse cursor 107 each time it is re-rendered.

In the example of FIG. 5B, the resizing controls 526 and certain connection controls 528 are highlighted in response to a user selecting the third object 103. Alternately or additionally, resizing controls 526, connection controls 528 and/or a translation control are highlighted in response to the mouse cursor 107 hovering over an area corresponding to the control, whether or not the object has been selected.

Figure 5E:
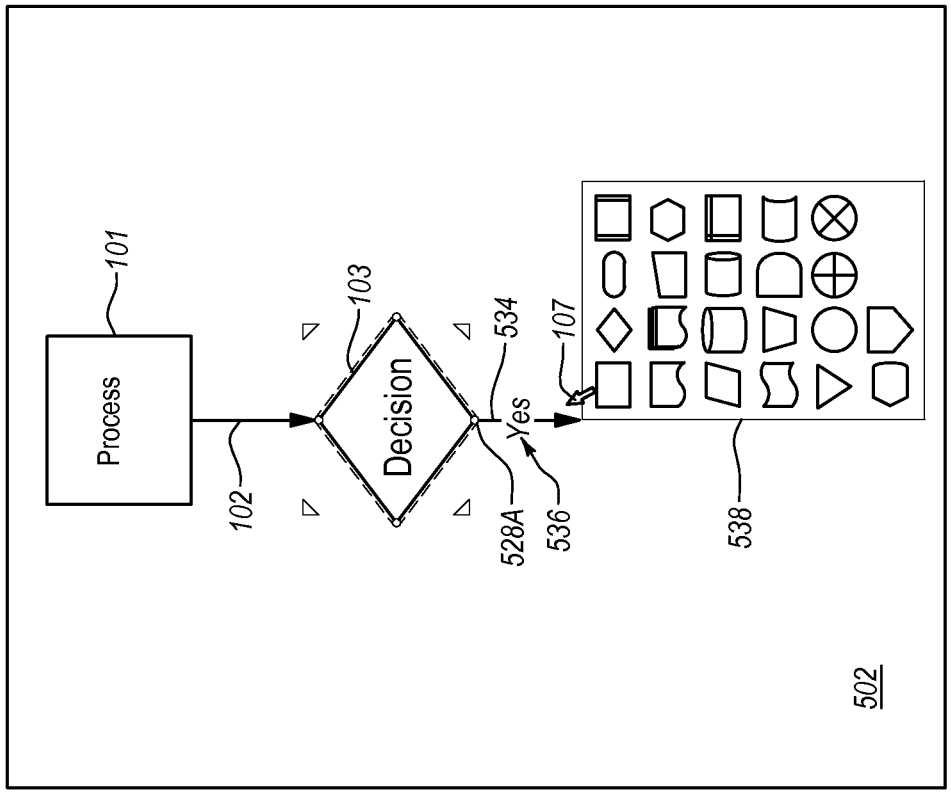
Figure 5D:
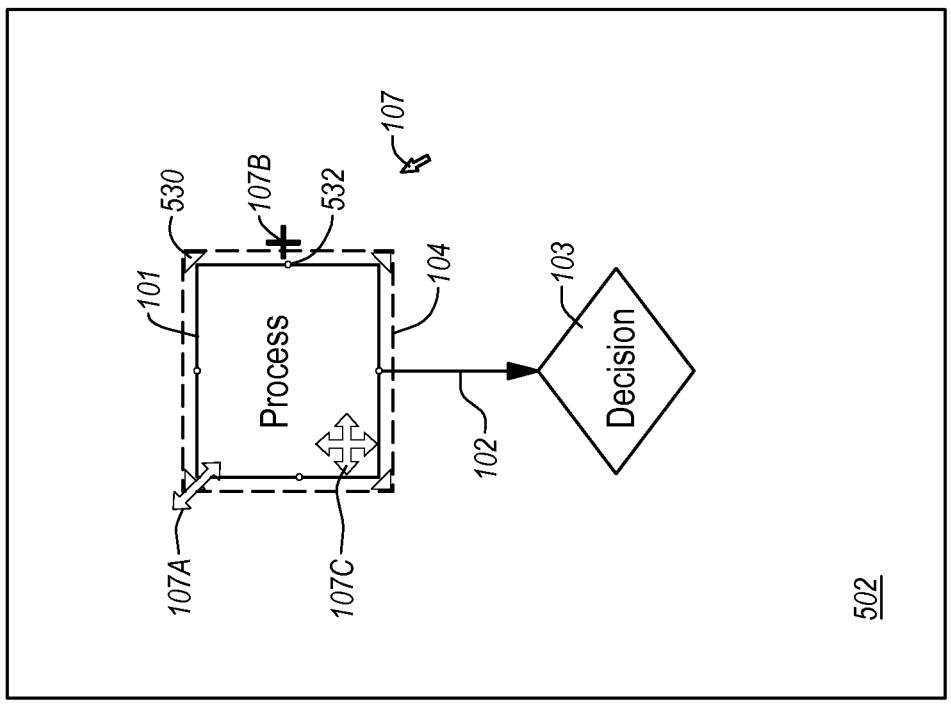

In FIG. 5D, for instance, resizing controls 530 at the four corners of the first layer 104 (only one resizing control 530 is labeled in FIG. 5D) and connection controls 532 on the first layer 104 at the four sides of the first object 101 (only one connection control 532 is labeled in FIG. 5D) may appear in response to the mouse cursor 107 hovering over any portion of the first layer 104, even though the first object 101 has not been selected. In some embodiments, the display of the resizing controls 530 and connection controls 532 in response to the mouse cursor 107 hovering over any portion of the first layer 104 visually indicates where the mouse cursor 107 can be moved to enable corresponding control of the first layer 104 and first object 101.

The display of the resizing controls 530 and connection controls 532 in the UI viewport 502 serves to highlight some of the controls available for the first layer 104 and first object 101. Alternately or additionally, a specific control that can be activated in a particular area may be highlighted by altering the appearance of the mouse cursor 107 when the mouse cursor 107 is hovering over the particular area to thereby indicate that the corresponding control can be activated while the mouse cursor 107 is in the particular area.

For instance, in response to the mouse cursor 107 hovering over an area of the first layer 104 near one of the resizing controls 530, the mouse cursor 107 may be altered to appear as a resizing cursor 107A that visually indicates to a user that the first layer 104 and first object 101 can be resized by clicking and dragging anywhere in the area in which the mouse cursor 107 appears as a resizing cursor 107A.

Alternately or additionally, in response to the mouse cursor 107 hovering over an area of the first layer 104 near one of the connection controls 532, the mouse cursor 107 may be altered to appear as a connection cursor 107B that visually indicates to a user that a connector can be connected to and/or initiated from the first layer 104 and first object 101 by clicking anywhere in the area in which the mouse cursor 107 appears as the connection cursor 107B. In response to dragging the connection cursor 107B—which may continue to appear as the connection cursor 107B or return to appear as the mouse cursor 107 during the drag—to a terminal location, a connector may be created that is connected to the first layer 104 and first object 101 at a connection point in the area where the click occurred and that terminates at the terminal location.

It should be noted that, although connection controls 528 are shown as discrete points on the corners of the third layer 106 and third object 103 in FIG. 5B, and connection controls 532 are shown as discrete points on the four sides of the first layer 104 and first object 101 in FIG. 5D, in some embodiments of the invention connection controls may be provided in one or more additional locations and/or different locations than are shown in FIGS. 5B and 5D. For example, connection controls may be provided at additional discrete points located along one or more edges of an object or corresponding layer. Alternately or additionally, connection controls may be provided continuously along one or more edges of an object or corresponding layer. Additional detail regarding this and other aspects of some example embodiments are provided below with respect to FIG. 5K.

Alternately or additionally, in response to the mouse cursor 107 hovering over an area of the first layer 104 that is more than a predetermined distance from the nearest resizing control 530, connection control 532, or text field of the first object 101, the mouse cursor 107 may be altered to appear as a translation cursor 107C. The translation cursor 107C visually indicates to a user that the first layer 104 and first object 101 can be moved to a different location in the UI viewport 502 by clicking anywhere in the area in which the mouse cursor 107 appears as the translation cursor 107C. In response to dragging the translation cursor 107C—which may continue to appear as the translation cursor 107C or return to appear as the mouse cursor 107 during the drag—the first layer 104 and first object 101 are moved about the UI viewport 502 wherever the cursor 107C or 107 is dragged.

While FIG. 5D simultaneously illustrates four different cursors, e.g., mouse cursor 107, resizing cursor 107A, connection cursor 107B, and translation cursor 107C, generally, only a single a cursor 107, 107A, 107B or 107C appears in the UI 500 at any given time according to some embodiments. The cursors 107, 107A, 107B and 107C are simultaneously illustrated in FIG. 5D as a matter of convenience to avoid the need for additional drawings and to illustrate that the appearance of the mouse cursor 107 may vary depending on whether the mouse cursor 107 is hovering over a layer and/or the particular area of the layer over which the mouse cursor 107 is hovering.

FIG. 5E illustrates how creation of a document including objects can be streamlined according to some aspects of the invention. For instance, in response to a user positioning the mouse cursor 107 over the connection control 528A of the third object 103 and clicking and dragging the mouse cursor 107 to the terminal location where the mouse cursor 107 is positioned in FIG. 5E, a connector 534 is automatically created without the user previously manually selecting a connector drawing mode. As seen in FIG. 5E, the connector 534 begins at and is connected to the third object 103 at a connection point corresponding to the connection control 528A and terminates near the terminal location of the mouse cursor 107.

Optionally, first predetermined text 536 is automatically populated in the connector 534 based on the object to which the connector 534 is connected and/or whether any other connectors 534 have already been created that are connected to the third object 103. In this case, whereas the third object 103 is a decision block in a flowchart and decision blocks are often followed by a "Yes" path and a "No" path, the first connector 534 may be automatically populated with the text "Yes" while the next connector that is connected to the third object 103 may be automatically populated with the text "No." Alternately, the first connector 534 can be automatically populated with the text "No" while the next connector can be automatically populated with the text "Yes." Alternately or additionally, a user can configure connectors that are connected to decision blocks (or other objects) to automatically populate with some other predetermined text besides "Yes" or "No."

Alternately or additionally, in response to the user releasing the mouse cursor 107 at a desired terminal location for terminating the connector 534, a set 538 of objects are presented in the UI viewport 502 to the user near the terminal location or elsewhere in the UI viewport 502. In certain embodiments, the set 538 of objects is presented to the user in a new pop-up or context menu. The set 538 of objects may include objects that are likely to be added to the document and connected to the connector 534 based on the objects 101-103 and/or 534 already included in the document, the type of diagram or document being drawn, user history or preferences, settings, object libraries that are open or have been recently or frequently used, etc. For instance, in the example illustrated by FIG. 5E, because all of the objects 101-103 and 534 are flowchart objects, indicating that the user is creating a flowchart, the set 538 of objects presented in the UI viewport 502 near the terminal location may include flowchart objects.

Figure 5F:
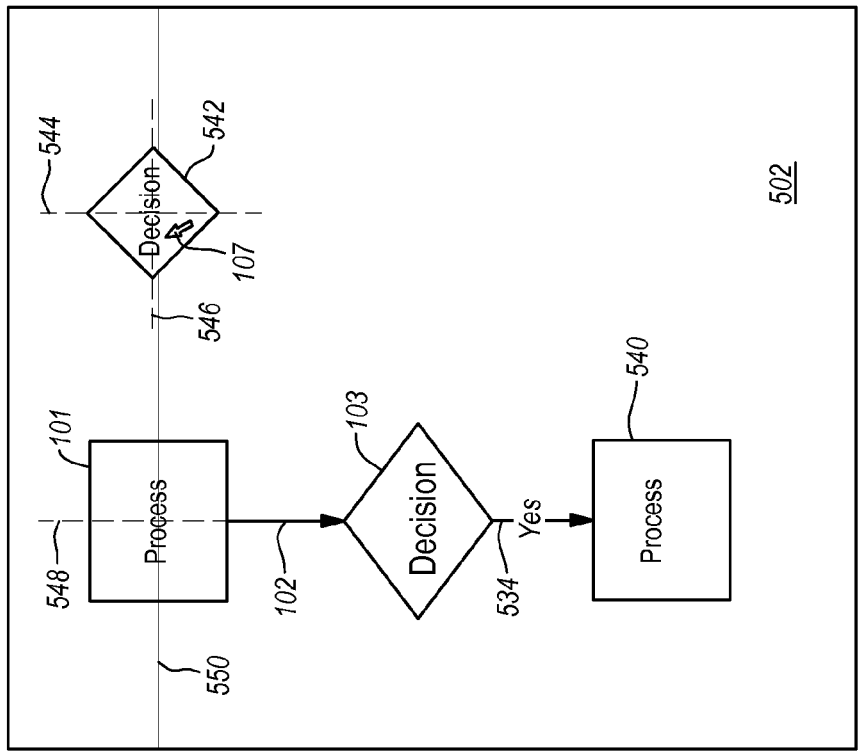

After the set 538 of objects is presented in the UI viewport 502, the user can select a particular object from the set 538. In response to the user selection, the selected object is created, connected to the connector 534 near the terminal location and rendered in the UI viewport 502. For instance, the object presented at the upper left corner of the set 538 of objects represents a process block. If the user selects the representation of the process block, the process block 540 of FIG. 5F is created, connected to the connector 534 near the terminal location and rendered in the UI viewport 502. According to certain embodiments of the invention, the ordering and appearance of objects within the set 538 of objects may be automatically adjusted based on detecting a user's history or preferences using techniques now known or later developed, or based on selections by users. For example, if a user frequently uses a certain type of object with a certain type of border color, fill color, and/or text style/size/color, the user may add an object with these properties to the set 538 of objects, or such an object may be added automatically.

FIG. 5F additionally illustrates an example of an alignment hint that is provided according to some embodiments while an object is being repositioned. In the example of FIG. 5F, a decision block 542 is in the process of being repositioned. The decision block includes both a vertical axis 544 and a horizontal axis 546. The first object 101 similarly includes a vertical axis 548 and a horizontal axis (not shown) that is collinear with alignment hint line 550. As the user is repositioning the decision block 542, the alignment hint line 550 may be automatically displayed in the UI viewport 502 when the horizontal axis 546 of the decision block 542 is within a predetermined distance from the horizontal axis of the first object 101. In some examples, if the user releases the decision block 542 while the alignment hint line 550 is displayed, the decision block 542 is snapped into alignment with the first object 101 such that the horizontal axis 546 is collinear with the alignment hint line 550.

Vertical alignment hint lines are alternately or additionally displayed when the decision block 542 is being moved above or below the first object 101 and the vertical axis 544 of the decision block 542 comes within a predetermined distance from the vertical axis 548 of the first object 101. More generally, vertical, horizontal, and/or other alignment hint lines are displayed in some examples when a first object is being moved about and a vertical, horizontal, or other axis of the first objects comes within a predetermined distance of a corresponding vertical, horizontal, or other axis of a second object.

Figure 5G:
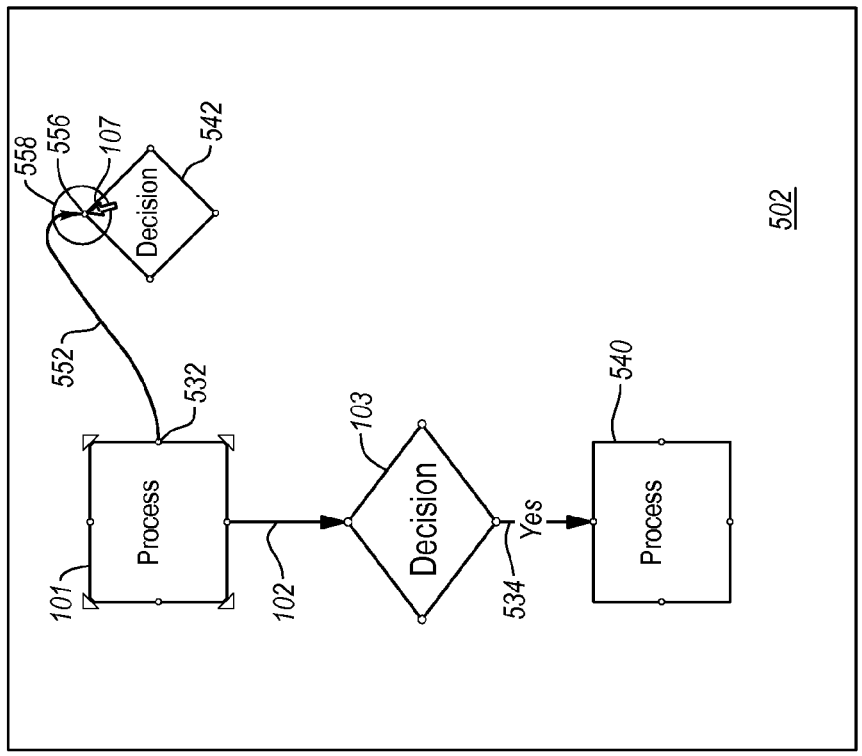

FIG. 5G illustrates an example of an indicator that can be provided in the UI viewport 502 to indicate the ability to link a connector to another object. In particular, a connector 552 connected to the first object 101 is created by clicking on the connection control 532 of the first object 101 and dragging the mouse cursor 107 to a desired terminal location. In this case, the terminal location is near an upper connection control 556 of the decision block 542.

In the illustrated embodiment of FIG. 5G, an indicator 558 including a circle centered on and highlighting the upper connection control 556 is displayed when the mouse cursor 107 comes within a predetermined area surrounding the upper connection control 556 while the connector 552 is being dragged about the UI viewport 502. The indicator 558 provides a visual indication of an ability to link the connector 552 to the decision block 542 at a connection point corresponding to the upper connection control 556. Releasing the connector 552 while the indicator 558 is displayed may serve as confirmation by the user that the user desires to link the connector 552 to the decision block 542 at the upper connection control 556. As discussed previously, according to some embodiments of the invention connection controls may be located continuously along the edges of objects (e.g. decision block 542), and therefore the connection controls illustrated in FIG. 5 are a representative set (and not an exhaustive set) of connection controls.

Optionally, and as seen in FIG. 5G, while the connector 552 is being dragged about the UI viewport 502, some connection controls on some or all of the objects in the UI viewport 502 are displayed to provide a preliminary indication to the user of at least some potential terminal locations for the connector 552.

Figure 5H:
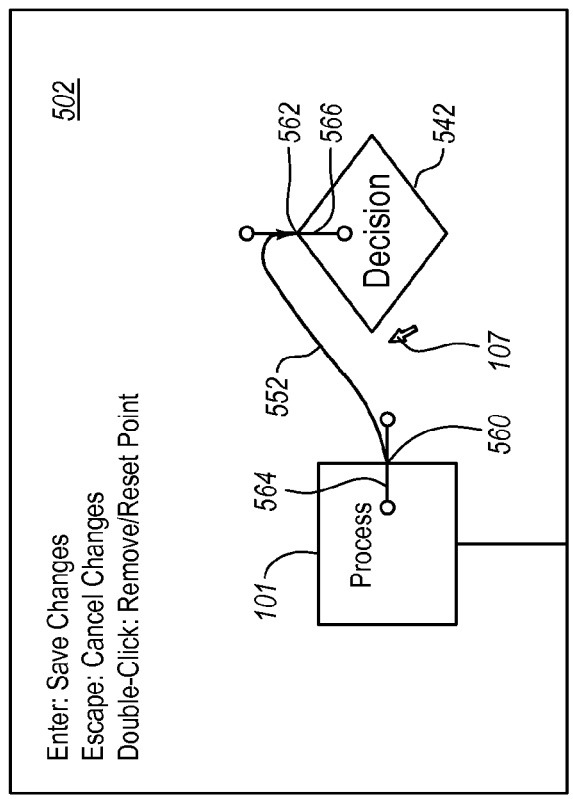
Figure 5I:
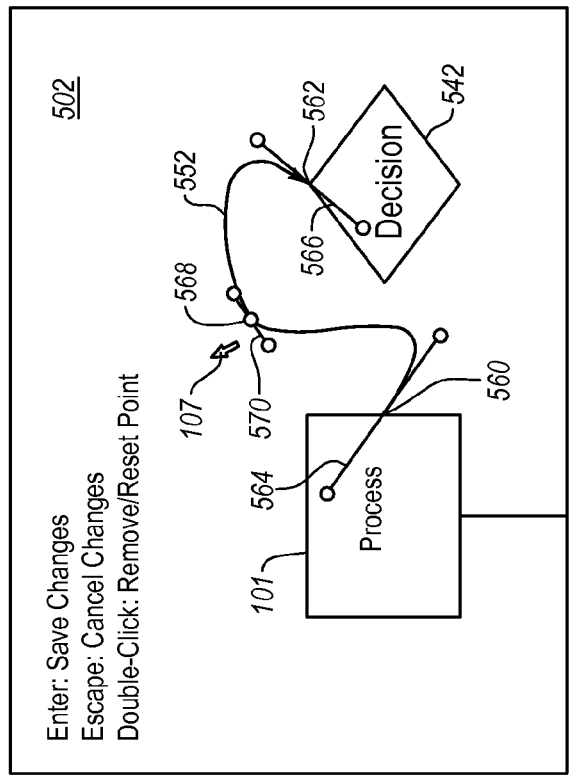

FIGS. 5H and 5I illustrate an example of line editing of connectors, such as the connector 552, that is provided according to some embodiments. In these and some other embodiments, curved lines such as the connector 552 may be represented with sets of quadratic Bezier curves that automatically curve to look correct in their approach to blocks they are attached to.

According to certain embodiments, when the connector 552 is first created, it has two control points 560, 562, one each at the beginning and end of the connector 552. In response to the user selecting a line editing mode, a control bar 564, 566 passing through each control point 560, 562 is displayed in the UI viewport 502. The angle of each control bar 564, 566 in some embodiments generally determines the angle of the connector 552 as it approaches the corresponding control point 560, 562. The length of each control bar 564, 566 may generally determine the amount of length of the connector 552 that approaches the corresponding control point 560, 562 at about the determined angle.

By clicking on and rotating the control bar 564, 566 about the corresponding control point 560, 566, the user can change the angle of the control bar 564, 566, and thus the angle of the connector 552 as it approaches the corresponding control point 560, 562. Alternately or additionally, by clicking on and resizing the ends of the control bar 564, 566, the user can change the amount of length of the connector 552 that approaches the corresponding control point 560, 562 at about the determined angle. For instance, FIG. 5I illustrates an example in which the angles and lengths of both control bars 564, 566 have been modified and further illustrates the corresponding changes to the connector 552.

Alternately or additionally, the user can add new control points, such as the user-added control point 568, by, e.g., clicking at a desired location on the connector 552 for the control point 568. The user-added control point 568 may generally define a point in the UI viewport 502 through which the connector 552 passes. Optionally, the user-added control point 568 can be repositioned by clicking and dragging on the user-added control point 568. Additionally, a control bar 570 associated with the user-added control point 568 may provide the same functions as the control bars 564, 566 associated with control points 560, 562.

Figure 5J:
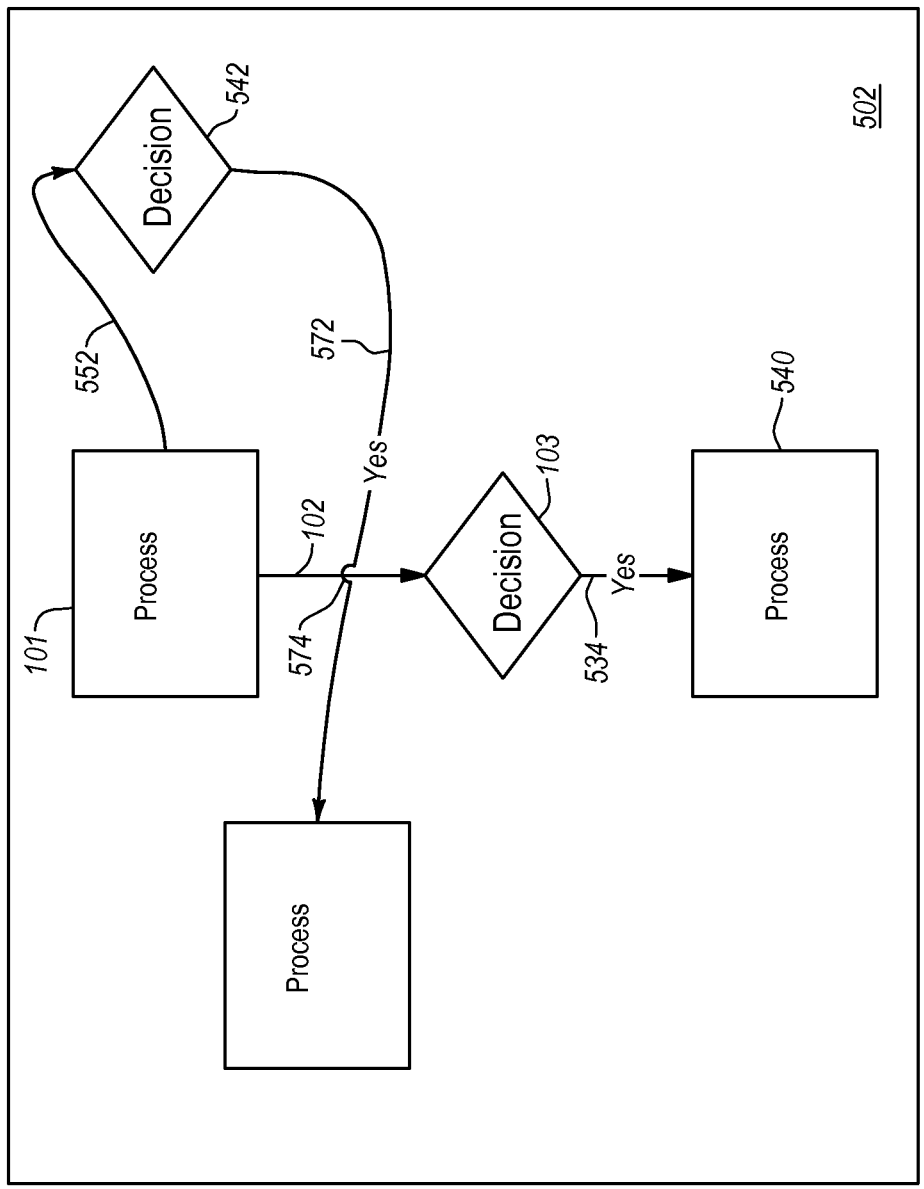

FIG. 5J illustrates an example of the handling of crossing connectors 102, 572 according to some embodiments. As seen in FIG. 5J, the connector 572 crosses over the second object 102 which is also a connector. The connector 572 includes a jump feature 574 to indicate that the connector 572 crosses over and is not connected to the second object 102.

In some examples, a jump feature such as the jump feature 574 is added to a particular connector such as the second object 102 when a different connector such as the connector 572 is created that crosses over the particular connector or is repositioned such that it crosses over the particular connector. Thus, even though none of the attributes of the particular connector have been changed by the creation or repositioning of the different connector, the creation or repositioning of the different connector may nevertheless affect how the final rendered existing connector appears. Accordingly, some embodiments track which connectors have changed since a previous rendering and additionally run a preprocessing routine that identifies any other connectors that may have been affected by the changes.

The preprocessing routine may include one or more tests to determine whether two connectors actually intersect such that a jump feature should be added to one or the other. For instance, the preprocessing routine can include a computationally heavy connector intersection test to determine whether two connectors actually intersect. Alternately or additionally, the preprocessing routine includes a computationally simple axis-aligned bounding box ("AABB") test to determine if two connectors potentially overlap, followed by the actual connector intersection test on positives of the AABB test. Alternately or additionally, the AABB test can be followed up with a second AABB test in a rotated coordinate frame to eliminate false positives from the first AABB test, followed by the actual connector intersection test on only the positives from the second AABB test.

All connectors that are found to overlap may be marked as changed and, at render time, some amount of reprocessing is done on the marked connectors to determine if an update of the connector is needed. While the preprocessing routine has been described in the context of overlapping connectors, the preprocessing routine is more generally applicable to any set of objects that potentially overlap one another.

Connection controls have previously been disclosed with respect to, e.g., FIGS. 5B and 5D showing four discrete connection controls 528 (FIG. 5B) and 532 (FIG. 5D) at specific locations on each of objects 103, 101, respectively. As noted above, however, connection controls in certain embodiments may alternately or additionally be provided discretely or continuously at other locations along the edges of an object.

Figure 5K:
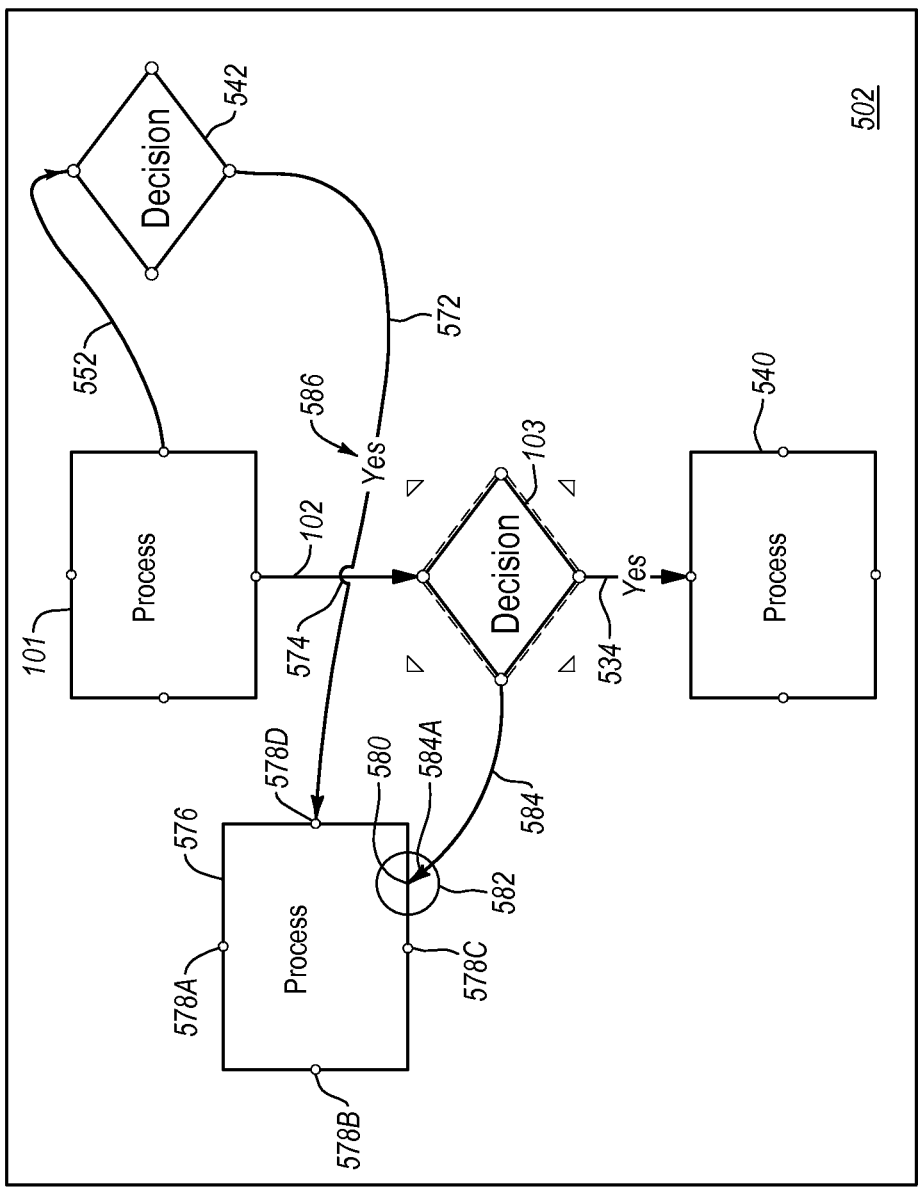

For example, FIG. 5K illustrates an object 576 including connection controls 578A-578D (collectively "connection controls 578") located at about the midpoint along each edge of the object 576. According to certain embodiments, the object 576 may further include one or more additional connection controls located at other discrete locations along the edges of the object 576 or that are continuously available at about any point along the edges of the object 576.

One such additional connection control 580 located on a lower edge of the object 576 is illustrated in FIG. 5K. According to some embodiments, the location of connection control 580 is identified by an indicator 580 centered about connection control 580. The indicator 580 may appear when a terminal end 584A of a connector 584 is dragged to within a predetermined distance of the connection control 580. Although FIG. 5K identifies the location of a single additional connection control 580 beyond connection controls 578, in certain embodiments the object 576 has multiple additional connection controls that may be identified by an indicator, such as the indicator 580, when the terminal end of a connector is dragged to within a predetermined distance of the additional connection control. Accordingly, embodiments of the invention permit objects such as connectors to be connected to virtually any location of an object and not solely to one of four discrete connection controls such as the connection controls 528 and 532 of FIGS. 5B and 5D.

According to some embodiments, text included in an object, such as text 586 included in connector 572, can be moved along the object and continuously updated/rendered in real time as the text is moved around. For example, as shown in FIG. 5K, the text 586 of connector 572 is located to the right of the second object 102. However, the text 586 may be moved along the connector 572 to any location along the connector 572, such as to a new location to the left of the second object 102 as depicted in FIG. 5L.

Figure 5L:
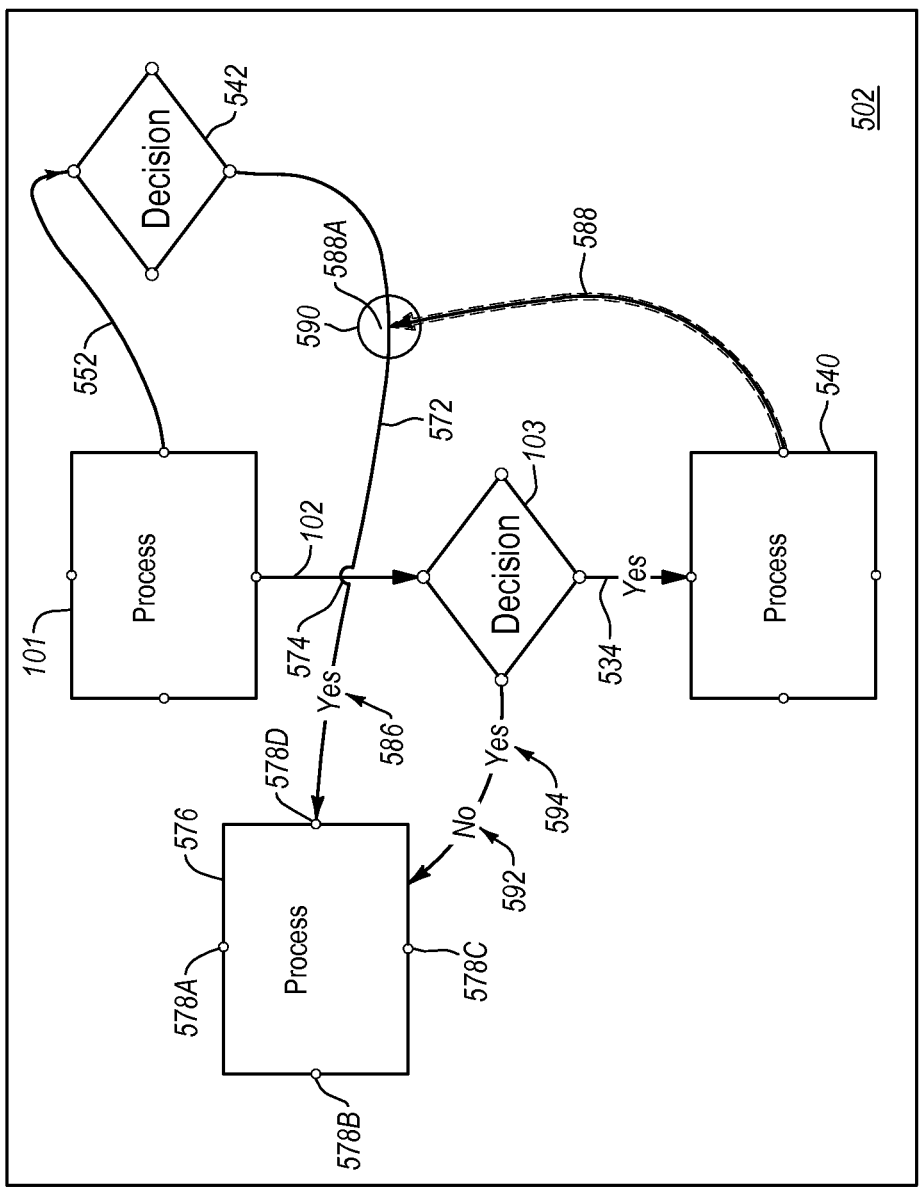

While FIGS. 5K and 5L illustrate the text 586 being located inline with the connector 572, in other embodiments the text 586 may be located near, but not inline with, the connector 572. For instance, the text 586 may be moved immediately above, below, to the left, or to the right of any portion of the connector 572.

FIG. 5L additionally illustrates the connection of one connector 588 to another connector 572. That is, connectors are not excluded from being connected to other connectors. Indeed, connectors and other objects can generally be connected to any other connector or other object. In the illustrated embodiment, as a terminal end 588A of connector 588 is moved about by a user, an indicator 590 may appear when the terminal end 588A is within a predetermined distance from a point on the connector 572 to indicate that the connector 588 can be connected to the connector 572 at the point on the connector 572 that the indicator 590 is centered on.

As depicted in FIGS. 5E-5G, and 5J-5K, some connectors, such as the connectors 534, 572, can include a text field, such as text fields 536 (FIG. 5E) and 586 (FIG. 5K). Alternately or additionally, connectors can include multiple text fields. For example, as illustrated in FIG. 5L, the connector 584 includes two text fields 592, 594. More generally, each connector can include as few as zero text fields or one or more text fields, as desired.

Various embodiments of the invention have been described in relation to actions performed by a user with an input device such as a mouse. Alternately or additionally, the embodiments disclosed herein can be described in relation to the user input received by the client device via any input device, such as a mouse or a touchscreen interface (including those with multi-touch capability) or the like. Generally, the user input includes data and/or signals indicative of the actions performed by the user. Those skilled in the art will appreciate, with the benefit of the present disclosure, the relation between the actions performed by a user with an input device and the user input received by the client device.

V. Example Methods of Operation

Turning next to FIGS. 6A-7B, various example methods of operation are described according to some embodiments of the invention. One skilled in the art will appreciate that, for the processes and methods disclosed herein, the acts performed in the processes and methods may be implemented in differing order than disclosed herein. Furthermore, the outlined acts and operations are only provided as examples, and some of the acts and operations may be optional, combined into fewer acts and operations, or expanded into additional acts and operations without detracting from the essence of the disclosed embodiments.

Figure 6A:
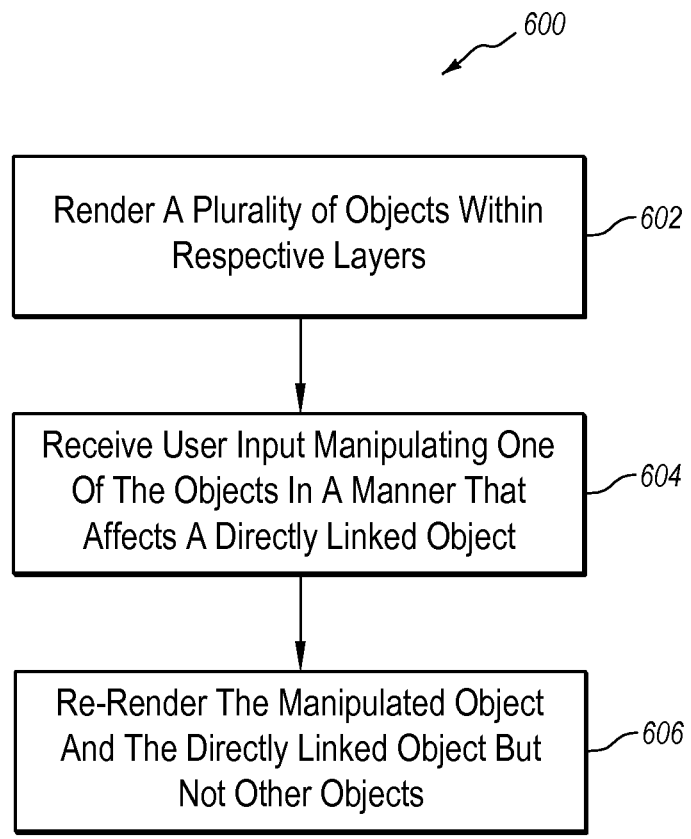
FIG. 6A is a flowchart of an example method for rendering graphical objects on a display of a client device.

FIG. 6A is a flowchart of an example method 600 for rendering graphical objects on a display of a client device, such as the display 332 and client device 300 of FIG. 3. Although not required, in some embodiments, the method 600 is executed by the client device in response to the client device executing a runtime script including instructions for performing the method 600, the runtime script being provided to the client device in a web page loaded by a web browser executing on the client device. Runtime script, such as for example JavaScript, is built to interact with the native browser, native form elements, and native web functionality. One of the benefits to using Javascript over technologies such as Flash is that a JavaScript application can be readily extended via public application programming interfaces ("APIs"). More generally, however, one or more of the acts described in association with the method 600 may be performed by hardware, software, or a combination thereof, as may be embodied by one or more computing systems such as a client system, a server system, or the like. Additionally, the method 600 will be discussed in the context of the objects 101-103 and layers 104-106 of FIG. 1, with the understanding that the method 600 is not limited to the specific embodiment of FIG. 1.

The method 600 begins by rendering 602 a plurality of objects 101-103 within respective layers 104-105. The second object 102 is directly linked to the first object 101 and the third object 103 is directly linked to the second object 102. According to some embodiments, each of objects 101-103 is rendered 602 within respective layers 104-105 based on corresponding intermediate data structures 400 (FIG. 4) for each object 101-103. Alternately or additionally, each of the objects 101-103 is rendered by reference to the respective layer 104-105 within which the object 101-103 contained.

The method 600 continues by receiving 604 user input manipulating one of the objects 101-103 in a manner that affects a directly linked object 101-103. In the present example, the user input is effective to move the first object 101 from the position shown in FIG. 1 to a new position (not shown). Alternately or additionally, the user input manipulating the first object 101 includes user input manipulating the first layer 104.

The method 600 proceeds by re-rendering 606 the manipulated first object 101 and the second object 102 that is directly linked to the first object 101 without re-rendering the third object 103 that is not directly linked to the first object 101. In some embodiments, the manipulated first object 101 and directly linked second object 102 are re-rendered substantially in real time while the first object 101 is being manipulated.

Although not shown in FIG. 6A, various other acts and operations may be included in variations of the method 600. For example, as already indicated above, the layers 104-106 may be slightly larger than the objects 101-103 contained therein, and each layer 104-106 may include at least one of a resizing control, translation control, and connection control. In this example, the method 600 may further include receiving user input causing a mouse cursor 107 displayed on a display to hover over an area of a layer 104-106 corresponding to a particular control, and highlighting the particular control, as described with respect to FIG. 5D, for instance.

As another example, each of the first layer 104 and third layer 106 may include connection points corresponding to connection controls 532, 528 of the first and third layer 104, 106. Further, the first and third objects 101, 103 may be created prior to creating the second object 102, analogous to the manner in which the first object 101 and decision block 542 of FIGS. 5F and 5G were created prior to creating the connector 552 of FIG. 5G. In this example, the method 600 may further include, prior to creating and rendering the second object 102, receiving user input initiating creation of the second object 102 beginning from a connection point of the first object 101, and receiving user input terminating the second object 102 at a connection point of the third object 103, where the second object 102 is a connector linked to the first object 101 and third object 103 at corresponding connection points. In some embodiments, the user input initiating creation of the second object 102 from the connection point of the first object 101 represents a user action of selecting the connection point without previously manually selecting a connector drawing mode to draw the second object 102.

Alternately or additionally, and continuing with the example of the previous paragraph, the method 600 may further include, prior to receiving user input terminating the second object 102, providing a visual indication, such as the indicator 558 of FIG. 5G, of an ability to link the second object 102 to the third object 103 at a connection point of the third object 103. The method 600 may additionally include receiving user input, such as data representing the release of a mouse button, indicating confirmation that the user desires to link the second object 102 to the third object 103 at a connection point of the third object 103, and then linking the second object 102 to the third object 103 at a connection point of the third object 103.

As another example, the method 600 may include acts described in relation to FIGS. 5E-5F and the set 538 of objects displayed in FIG. 5E. For instance, considering some of the acts associated with FIGS. 5E-5F in the context of FIG. 1, the method 600 may include, prior to rendering the second and third objects 102-103, receiving user input initiating creation of the second object 102 beginning from a connection point of the first object 101, the second object 102 having a first end connected to the connection point of the first object 101 and a second end opposite the first end; receiving user input identifying a terminal location of the second end of the second object 102; in response to receiving the user input identifying the terminal location, presenting on the display a set of representations of objects, such as the set 538, for use as the third object 103; and receiving user input including a selection of a representation of the third object 103.

Alternately or additionally, instructions that are executable by a computing device, such as the client device 300 of FIG. 3, to perform the method 600 or any of the variations described hereinabove can be stored on a physical computer readable storage medium for execution by the computing device.

Figure 6B:
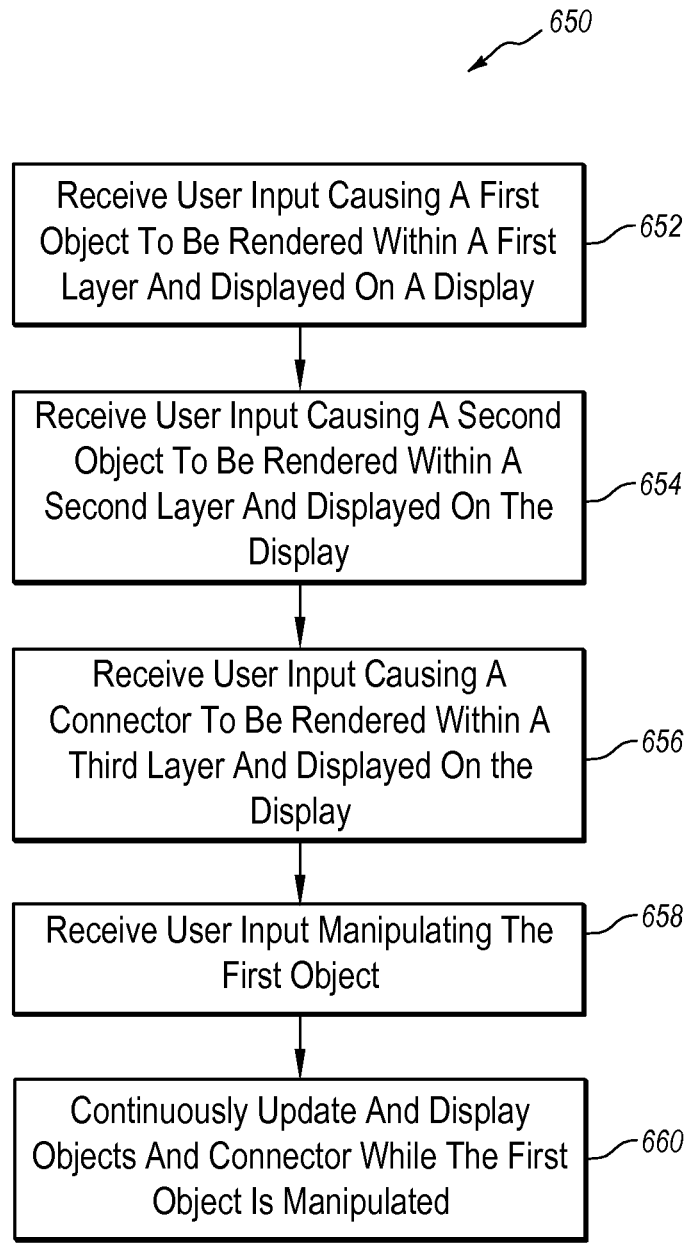
FIG. 6B is a flowchart of another example method for rendering graphical objects on a display of a client device.

FIG. 6B is a flowchart of another example method 650 for rendering graphical objects on a display of a client device, such as the display 332 and client device 300 of FIG. 3. Although not required, in some embodiments, the method 650 is executed by the client device. More generally, however, one or more of the acts described in association with the method 650 may be performed by hardware, software, or a combination thereof, as may be embodied by one or more computing systems such as a client system, a server system, or the like.

At 652, user input is receiving causing a first object to be rendered within a first layer and displayed on a display.

At 654, user input is received causing a second object to be rendered within a second layer and displayed on the display. In some embodiments, both of the first and second objects are simultaneously visible to a user after both objects have been rendered.

At 656, user input is received causing a connector to be rendered within a third layer and displayed on the display, the connector connecting the first and second objects. Note that in some embodiments, the connector may be a line that corresponds to a line drawn on the display between the first and second objects, but that in other embodiments of the invention, the connector may be of another nature and/or may take other shapes or forms.

At 658, user input is received manipulating the first object connected by the connector to the second object.

At 660, the first object, second object and connector are continuously updated and displayed substantially in real time during the manipulating of the first object. In some embodiments, act 660 includes continuously re-rendering the first object within the first layer and the third object within the third layer without re-rendering the second object within the second layer.

Figure 7A:
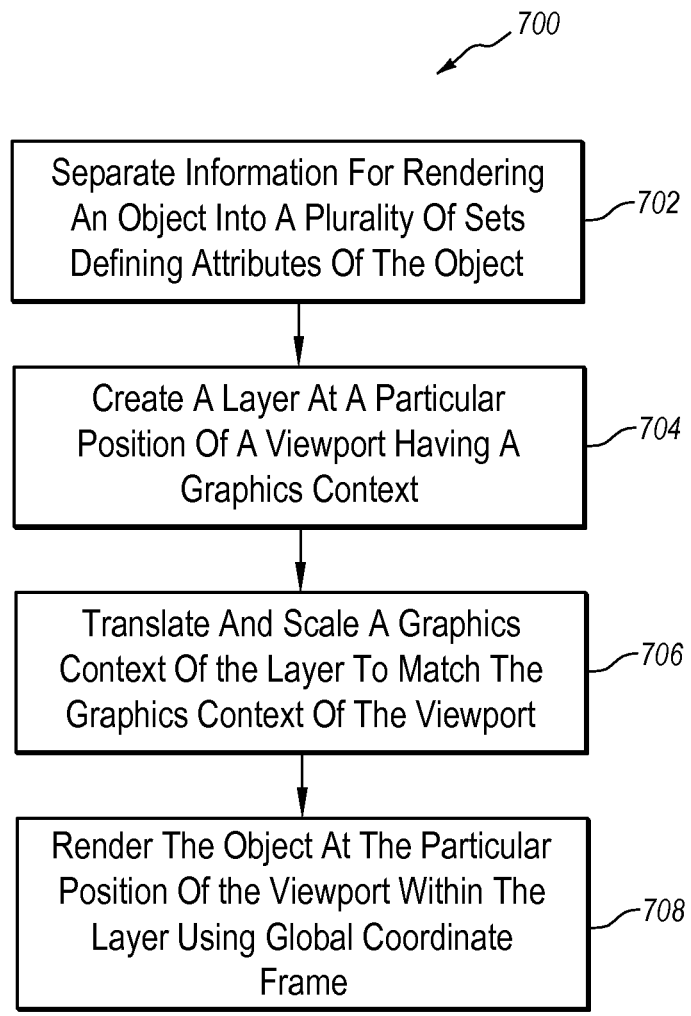
FIG. 7A is a flowchart of an example method for representing and rendering graphical objects on a display of a client device.

FIG. 7A is a flowchart of an example method 700 for representing and rendering graphical objects on a display of a client device, such as the display 332 and client device 300 of FIG. 3. Although not required, in some embodiments, the method 700 is executed by the client device. More generally, however, one or more of the acts described in association with the method 700 may be performed by hardware, software, or a combination thereof, as may be embodied by one or more computing systems such as a client system, a server system, or the like.

The method 700 begins by separating 702 information for rendering an object into a plurality of sets defining attributes of the object, such as the information sets 402, 404 of FIG. 4. In some embodiments, the object is configured to render within a particular graphics context of the layer. The graphics context of the layer may define, for instance, a local coordinate frame and/or a scale that may be the same as or different from a global coordinate frame and/or scale defined by a UI viewport in which the object is ultimately rendered.

At 704, the layer is created at a particular position of the UI viewport. The particular position of the UI viewport may correspond to a position of the UI viewport to where the user drags an object from a toolbar, such as the toolbar 504 of FIG. 5A, or a position of the UI viewport where the user terminates a connector, thereby prompting the user through a set 538 of representations of objects (FIG. 5E) to select and create an object near the terminal location, or the like.

At 706, the graphics context of the layer is translated and scaled to match the graphics context of the UI viewport.

At 708, the object is rendered at the particular position of the UI viewport within the layer using the global coordinate frame. Rendering 708 the object within the layer may include separately rendering the attributes of the object defined by the plurality of sets of information.

Although not shown in FIG. 7A, variations of the method 700 may additionally include other acts or operations. For instance, the method 700 may further include caching separately rendered attributes of the object defined by the plurality of sets of information; and in response to receiving user input modifying a particular attributed defined by a particular set, re-rendering the particular attribute defined by the particular set of information without re-rendering other attributes defined by other sets included in the plurality of sets of information.

Alternately or additionally, instructions that are executable by a computing device, such as the client device 300 of FIG. 3, to perform the method 700 or any of the variations described hereinabove can be stored on a physical computer readable storage medium for execution by the computing device.

Figure 7B:
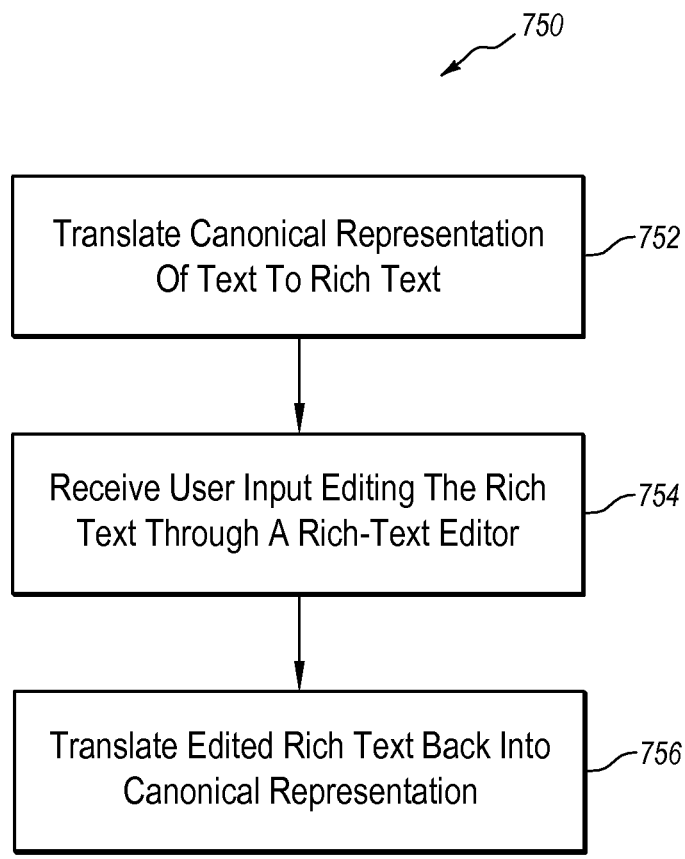
FIG. 7B is a flowchart of an example method for editing text of an object.

FIG. 7B is a flowchart of an example method 750 for editing text of an object that may be combined with the method 700 of FIG. 7A or other methods disclosed herein. In the example of FIG. 7B, information for rendering the object is separated into a plurality of sets including at least one set of information defining a rich text area of the object including a canonical representation of text.

At 752, the canonical representation of the text is translated to rich text.

At 754, user input effective to edit the rich text is received through a rich-text editor. The rich-text editor is a web browser-based editor according to some embodiments.

At 756, the edited rich text is translated into a canonical representation of the edited rich text.

In some embodiments, the canonical representation of the text is an XML representation of the text. Alternately or additionally, the rich text is an HTML representation of the text.

Figure 8:
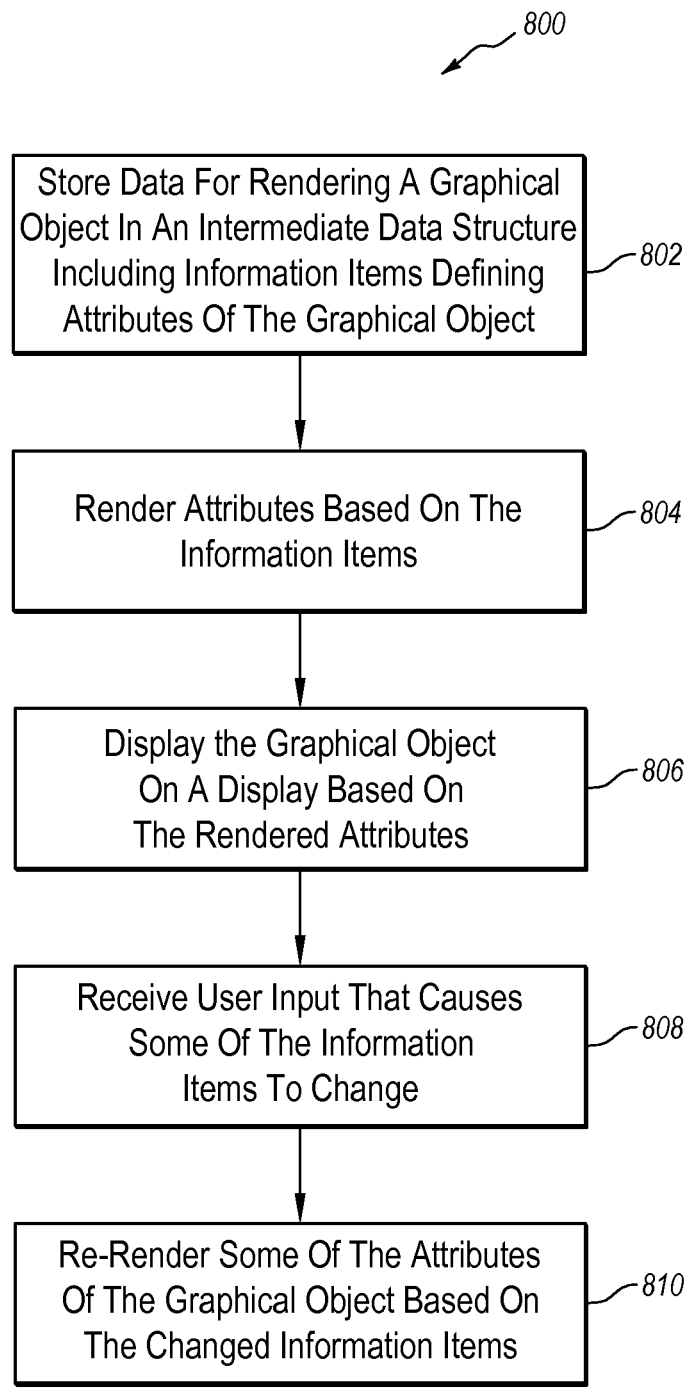
FIG. 8 is a flowchart of an example method for rendering graphical information on a display.

FIG. 8 is a flowchart of an example method 800 for rendering graphical information on a display of a client device, such as the display 332 and client device 300 of FIG. 3. Although not required, in some embodiments, the method 800 is executed by the client device. More generally, however, one or more of the acts described in association with the method 800 may be performed by hardware, software, or a combination thereof, as may be embodied by one or more computing systems such as a client system, a server system, or the like.

The method 800 begins by storing 802 data for rendering a graphical object in an intermediate data structure including a plurality of information items defining attributes of the graphical object. One example of an intermediate data structure is provided in FIG. 4 at 400. Various example information items are also provided in FIG. 4 at 406, 408, 410, 412, 414, 416, 418, 420, 422.

At 804, the attributes of the graphical object are rendered based on the information items.

At 806, the graphical object is displayed on a display based on the rendered attributes.

At 808, user input is received that causes at least some of the information items to change.

At 810, based on the changed information items, some, but not all, of the attributes of the graphical object are re-rendered. The act 810 may include, for example, determining whether each of the attributes of the graphical object is affected by the changed information items and re-rendering only those attributes that are determined to be affected by the changed information items. Alternately or additionally, act 810 may include re-rending an outline of the graphical object without re-rendering a rich text are of the graphical object. Alternately or additionally, act 810 may include re-rendering a rich text area of the graphical object without re-rendering an outline of the graphical object.

Alternately or additionally, instructions that are executable by a computing device, such as the client device 300 of FIG. 3, to perform the method 800 or any of the variations described hereinabove can be stored on a physical computer readable storage medium for execution by the computing device.

In view of the disclosure provided above, those skilled in the art will appreciate that some embodiments disclosed herein enable objects to be re-rendered virtually instantly in response to user commands without the processing delays associated with re-rendering objects in some applications. The ability to re-render objects virtually instantly can be leveraged to enable live "demonstrations" of products that implement some of the methods disclosed herein.

In this regard, it is noted that many websites and applications offer video demonstrations of how a particular application or service works. Many of these demonstrations include pre-recorded video that is a video screen capture showing the application interface, how the application responds, and how to use the application to accomplish certain desired actions or results.

According to some embodiments, however, an actual live demonstration can be provided on a client device for a user to see an application in action. In other words, rather than the demonstration being a mere video screen capture, the demonstration is an actual execution of the application using simulated user actions to show the application in action.

Figure 9:
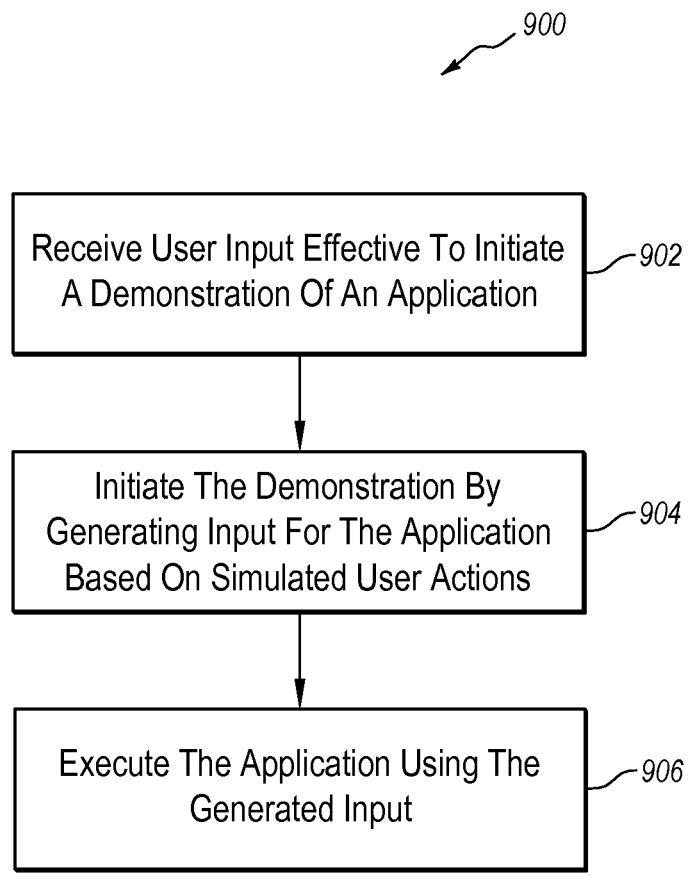
FIG. 9 is a flowchart of an example method for demonstrating the operation of an application.

FIG. 9 is a flowchart of an example method 900 for demonstrating the operation of an application as just explained. The method 900 begins in some embodiments after a user opens a web page using a web browser executing on a client device to access the application and is presented with or selects an option to view a demonstration of the application.

At 902, user input effective to initiate the demonstration of the application is received, e.g., by the client device. At 904, the demonstration is initiated by generating input for the application based on simulated user actions.

The generated input is provided to the application which is executed 906 using the generated input to provide a demonstration of the application in action. In some embodiments, executing 906 the application using the generated input includes creating and rendering a plurality of graphical objects on a display connected to the computing device in response to first generated input, and in response to second generated input effective to manipulate one or more of the plurality of graphical objects, updating and re-rendering on the display one or more of the plurality of graphical objects affected by the manipulation substantially in real time as the manipulation occurs.

Although not shown in FIG. 9, the method 900 may further include presenting an indication on the display that the demonstration is finished, and allowing a user to edit the plurality of graphical objects created during the demonstration.

The user actions simulated in the method 900 of FIG. 9 may include, for instance, mouse clicks and movements, key presses for typing text from a keyboard, finger swipes for touchscreen interfaces (including multiple concurrent swipes for multi-touch interfaces), etc. Additionally, the input generated from the simulated user actions is the same as the user input that would result from the user actually performing the simulated user actions.

In some embodiments, simulating a user action includes displaying output corresponding to the user action on a display. For example if the user action being simulated is a mouse click, the appearance of a mouse cursor displayed on the display may change to indicate that a mouse click occurred. Alternately or additionally, if the user action being simulated is a mouse movement, the mouse cursor displayed on the display may move across the display. Similarly, if the user action being simulated is a finger swipe, an indication of a swiping action may appear on the display. Alternately or additionally, if the user action being simulated is typing on a keyboard, text may appear on the display.

Accordingly, the user viewing the demonstration experiences an actual execution of the application where all the steps that are required to perform certain actions in the application necessarily happen right in front of the user since the application is actually being executed. In contrast, a video representation of an execution of an application may be edited and/or may omit certain steps such that it does not accurately represent the application.

Additionally, when an application is updated, a video demonstration of an earlier version of the application may become outdated and should also be updated to accurately reflect the newer version of the application. According to embodiments of the live demonstration disclosed herein, however, there is no video demonstration to update. Instead, when the application is updated, the live demonstration is also necessarily updated since the live demonstration includes execution of the application.

Further, from the point of view of a user viewing a video demonstration, the video demonstration may show a user how to use an application to create application output, such as a document, but the video demonstration itself does not produce the application output. For instance, while the video demonstration may show the user how to use an application to produce or edit a document, the video demonstration does not create an actual document that can be edited or otherwise used by the user. In contrast, because embodiments of the live demonstration described herein actually execute the application during the demonstration, any document or object created or edited during the demonstration becomes available to be edited or used by the user when the demonstration terminates.

Returning to FIG. 9, in some embodiments, the live demonstration occurs within a web browser that downloads a web page including the application. Because the user can control some aspects of the browser window, such as the size of the browser window, some embodiments of the method 900 may further include detecting the size of the browser window, and prior to the application outputting any visual output during the demonstration, scaling the visual output based on the detected size of the window.

Alternately or additionally, some embodiments of a UI presented to the user in response to execution of the application present different object libraries that can be collapsed and/or hidden by the user, as discussed above with respect to FIGS. 5A-5C and the button 506. In some cases, a live demonstration may involve objects from particular object libraries. As such, the method 900 of FIG. 9 may further include determining whether one or more object libraries including objects used in the live demonstration are available in the UI, and updating the UI to display the one or more object libraries if necessary.

Those skilled in the art will appreciate, with the benefit of the present disclosure, that the invention disclosed herein can be implemented in many different scenarios. For instance, an example website may allow users to drag and drop images of products into a electronic collage or other document. The products may be, for instance, apparel and accessories or other products. The principals disclosed herein can easily be applied to improve the rendering speed of such a website when a user drags new images into a collage, makes changes to existing images already in the collage, connects images together, views a demonstration of how the website works, or the like or any combination thereof. The foregoing is only one specific example of a specific application of some of the principles of the present invention and those skilled in the art will appreciate how to apply the principals of the present invention in other situations.

VI. General Aspects of Example Embodiments

Those skilled in the art will appreciate, with the benefit of the present disclosure, that the embodiments described herein can be adapted for alternative implementations beyond those explicitly disclosed herein. For example, while some embodiments have been described as methods implemented by instructions of a runtime script provided in a web page executed in a web browser, the methods or variations thereof can alternately be implemented in a proprietary plugin to obtain similar benefits to those described herein.

As another example, some of the methods described herein are optimized for a raster-based canvas implementation. However, the methods or variations thereof can be adapted for tag-based vector representations in a web browser, such as the Scalable Vector Graphics ("SVG") representation, through careful use of container elements, for instance.

The embodiments described herein may include the use of a special purpose or general-purpose computer including various computer hardware or software modules, as discussed in greater detail below.

Embodiments within the scope of the present invention also include computer-readable media for carrying or having computer-executable instructions or data structures stored thereon. Such computer-readable media can be any available media that can be accessed by a general purpose or special purpose computer. By way of example, and not limitation, such computer-readable media include physical computer readable storage media such as RAM, ROM, EEPROM, CD-ROM or other optical disk storage, magnetic disk storage or other magnetic storage devices, or any other physical medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media.

Computer-executable instructions include, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used herein, the term "module" or "component" can refer to software objects or routines that execute on the computing system. The different components, modules, engines, and services described herein may be implemented as objects or processes that execute on the computing system (e.g., as separate threads). While the system and methods described herein are preferably implemented in software, implementations in hardware or a combination of software and hardware are also possible and contemplated. In this description, a "computing entity" may be any computing system as previously defined herein, or any module or combination of modulates running on a computing system.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method of representing and rendering graphical objects, the method comprising:
    separating information for rendering a graphical object into a plurality of sets defining attributes of the graphical object, the graphical object configured to render within a local graphics context of a layer;
    creating the layer at a particular position of a viewport having a global graphics context defining a global coordinate frame;
    translating and scaling the local graphics context to match the global graphics context;
    rendering the graphical object at the particular position of the viewport within the layer using the global coordinate frame, wherein rendering the graphical object comprises separately rendering the attributes of the graphical object defined by the plurality of sets;
    caching the separately rendered attributes of the graphical object defined by the plurality of sets; and
    in response to receiving user input modifying a particular attribute defined by a particular set re-rendering the particular attribute defined by the particular set without re-rendering other attributes defined by other sets included in the plurality of sets.

2. The method of claim 1, wherein the plurality of sets include a set defining an outline of the graphical object and wherein a size of the layer is larger than the defined outline of the graphical object.

3. The method of claim 2, wherein the set defining an outline of the graphical object defines one or more of a color of a line making up the outline, a weight of the line making up the outline, a gradient of the line making up the outline, a shape of an area bounded by the outline, a fill color of the area bounded by the outline or a transparency level of the fill color.

4. The method of claim 1, wherein the plurality of sets include a set defining a rich text area of the graphical object.

5. The method of claim 4, wherein the set defining a rich text area of the graphical object defines one or more of a bounding box within which rich text is rendered or a canonical representation of the rich text.

6. The method of claim 5, wherein the canonical representation of the rich text comprises an Extensible Markup Language ("XML") representation of the rich text.

7. The method of claim 4, further comprising:
translating the canonical representation to rich text;
receiving user input effective to edit the rich text through a rich-text editor; and
translating the edited rich text to an edited canonical representation.

8. A non-transitory computer-readable storage medium having instructions stored thereon that are executable by a computing device to perform operations comprising:
separating information for rendering a graphical object into a plurality of sets defining attributes of the graphical object, the graphical object configured to render within a local graphics context of a layer;
creating the layer at a particular position of a viewport having a global graphics context defining a global coordinate frame;
translating and scaling the local graphics context to match the global graphics context;
rendering the graphical object at the particular position of the viewport within the layer using the global coordinate frame, wherein rendering the graphical object comprises separately rendering the attributes of the graphical object defined by the plurality of sets;
caching the separately rendered attributes of the graphical object defined by the plurality of sets; and
in response to receiving user input modifying a particular attribute defined by a particular set re-rendering the particular attribute defined by the particular set without re-rendering other attributes defined by other sets included in the plurality of sets.

9. The non-transitory computer-readable storage medium of claim 8, wherein the plurality of sets include a set defining an outline of the graphical object and wherein a size of the layer is larger than the defined outline of the graphical object.

10. The non-transitory computer-readable storage medium of claim 9, wherein the set defining an outline of the graphical object defines one or more of a color of a line making up the outline, a weight of the line making up the outline, a gradient of the line making up the outline, a shape of an area bounded by the outline, a fill color of the area bounded by the outline or a transparency level of the fill color.

11. The non-transitory computer-readable storage medium of claim 8, wherein the plurality of sets include a set defining a rich text area of the graphical object.

12. The non-transitory computer-readable storage medium of claim 11, wherein the set defining a rich text area of the graphical object defines one or more of a bounding box within which rich text is rendered or a canonical representation of the rich text.

13. The non-transitory computer-readable storage medium of claim 12, wherein the canonical representation of the rich text comprises an Extensible Markup Language ("XML") representation of the rich text.

14. The non-transitory computer-readable storage medium of claim 11, the operations further comprising:
translating the canonical representation to rich text;
receiving user input effective to edit the rich text through a rich-text editor; and
translating the edited rich text to an edited canonical representation.

* * * * *